United States Patent
Melakari et al.

(10) Patent No.: US 11,030,720 B2
(45) Date of Patent: Jun. 8, 2021

(54) DIRECT RETINAL PROJECTION APPARATUS AND METHOD

(71) Applicant: Varjo Technologies Oy, Helsinki (FI)

(72) Inventors: Klaus Melakari, Oulu (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/431,335

(22) Filed: Jun. 4, 2019

(65) Prior Publication Data
US 2020/0234408 A1 Jul. 23, 2020

Related U.S. Application Data

(63) Continuation of application No. 16/254,099, filed on Jan. 22, 2019, and a continuation of application No. 16/254,008, filed on Jan. 22, 2019, now abandoned, and a continuation of application No. 16/296,639, filed on Mar. 8, 2019, and a continuation of application No. 16/361,669, filed on Mar. 22, 2019, now Pat. No. 10,771,774.

(51) Int. Cl.
| | |
|---|---|
| *G06T 3/40* | (2006.01) |
| *G06T 5/00* | (2006.01) |
| *H04N 13/383* | (2018.01) |
| *H04N 13/239* | (2018.01) |
| *H04N 13/344* | (2018.01) |

(52) U.S. Cl.
CPC ............ *G06T 3/4053* (2013.01); *G06T 5/006* (2013.01); *H04N 13/239* (2018.05); *H04N 13/344* (2018.05); *H04N 13/383* (2018.05)

(58) Field of Classification Search
None
See application file for complete search history.

(56) References Cited

U.S. PATENT DOCUMENTS

| | | | |
|---|---|---|---|
| 10,861,372 B2 * | 12/2020 | Trythall | G02B 27/0093 |
| 2012/0154277 A1 * | 6/2012 | Bar-Zeev | G06F 3/013 |
| | | | 345/158 |

(Continued)

OTHER PUBLICATIONS

'Resolving the Vergence-Accommodation Conflict in Head-Mounted Displays', by Gregory Kramida, IEEE Transactions on Visualization and Computer Graphics, vol. 22, No. 7, pp. 1912-1931, Jul. 2016. (Year: 2016).*

*Primary Examiner* — James A Thompson
(74) *Attorney, Agent, or Firm* — Ziegler IP Law Group, LLC

(57) ABSTRACT

A direct retinal projection apparatus including means for detecting a gaze direction of a user, a projector, a first optical element, an actuator and a processor. The first optical element includes different optical portions having different optical properties with respect to magnification. The processor is configured to render a warped image having a spatially-uniform angular resolution via the projector, whilst adjusting an orientation of the first optical element via the actuator, based on the detected gaze direction, to direct a projection of the warped image from the first optical element towards a retina of a user's eye. Projections of different portions of the warped image are differently magnified by the different optical portions of the first optical element to produce on the retina of the user's eye a de-warped image having a spatially-variable angular resolution.

21 Claims, 12 Drawing Sheets

(56) References Cited

U.S. PATENT DOCUMENTS

| | | | |
|---|---|---|---|
| 2013/0229705 A1* | 9/2013 | Suzuki | G02B 27/4211 |
| | | | 359/361 |
| 2014/0267205 A1* | 9/2014 | Nestorovic | G02B 27/0101 |
| | | | 345/208 |
| 2018/0367769 A1* | 12/2018 | Greenberg | G02B 26/10 |
| 2019/0331919 A1* | 10/2019 | Huo | H04N 5/23232 |
| 2020/0051320 A1* | 2/2020 | Laffont | G06F 1/163 |

* cited by examiner

DIRECT RETINAL PROJECTION APPARATUS AND METHOD

TECHNICAL FIELD

The present disclosure relates to direct retinal projection apparatus. Moreover, the present disclosure also relates to methods of displaying, via the aforementioned direct retinal projection apparatus.

BACKGROUND

In recent times, several technologies (for example, such as virtual reality (VR), augmented reality (AR), mixed reality (MR) and extended reality (XR)) are being used to present interactive simulated environments to users. The users utilize specialized Head-Mounted Devices (HMDs) for experiencing and interacting with such simulated environments.

However, conventional specialized HMDs have certain limitations associated therewith. Firstly, the conventional HMDs provide a narrow field of view, due to limitations of existing displays implemented therein. Secondly, the conventional HMDs also fail to provide a high-resolution display, which prevents the user from immersing into a simulated environment presented therein. Thirdly, if at all a high-resolution display is provided, it has been achieved by implementing larger displays to increase the resolution uniformly in an entire visual scene. Notably, visual sensitivity of the human visual system is at least an order of magnitude greater at a center of gaze than at a peripheral visual field. In this regard, presenting a uniform level of detail across a display wastes computational resources (for example, power, memory, processing time, etc.), because the human visual system does not process visual detail equally over the whole visual field. Therefore, in light of the foregoing discussion, there exists a need to overcome the aforementioned drawbacks associated with conventional HMDs.

SUMMARY

The present disclosure seeks to provide a direct retinal projection apparatus. The present disclosure also seeks to provide a method of displaying, via a direct retinal projection apparatus. The present disclosure seeks to provide at least a portion of a visual scene whereat a user's gaze is directed with a high resolution, whilst also providing for a wide field of view. Moreover, the present disclosure also seeks to provide a solution to the existing problems of pixel density and physical size trade-offs in devices implementing simulated environments.

In one aspect, an embodiment of the present disclosure provides a direct retinal projection apparatus comprising:
  means for detecting a gaze direction of a user;
  at least one projector;
  at least one first optical element comprising at least a first optical portion and a second optical portion having different optical properties with respect to magnification;
  at least one first actuator associated with the at least one first optical element; and
  a processor configured to render a warped image having a spatially-uniform angular resolution via the at least one projector, whilst adjusting an orientation of the at least one first optical element via the at least one first actuator, based on the detected gaze direction of the user, to direct a projection of the warped image from the at least one first optical element towards a retina of a user's eye, wherein projections of a first portion and a second portion of the warped image are differently magnified by the first optical portion and the second optical portion of the at least one first optical element, respectively, to produce on the retina of the user's eye a de-warped image having a spatially-variable angular resolution.

In another aspect, an embodiment of the present disclosure provides a method of displaying, via a direct retinal projection apparatus comprising at least one projector and at least one first optical element, the method comprising:
  detecting a gaze direction of a user;
  rendering a warped image having a spatially-uniform angular resolution via the at least one projector; and
  adjusting an orientation of the at least one first optical element, based on the detected gaze direction of the user, to direct a projection of the warped image from the at least one first optical element towards a retina of a user's eye, wherein the at least one first optical element comprises at least a first optical portion and a second optical portion having different optical properties with respect to magnification, and wherein projections of a first portion and a second portion of the warped image are differently magnified by the first optical portion and the second optical portion of the at least one first optical element, respectively, to produce on the retina of the user's eye a de-warped image having a spatially-variable angular resolution.

Embodiments of the present disclosure substantially eliminate or at least partially address the aforementioned problems in the prior art, and enable a direct retinal projection apparatus for implementing simulated environments to mimic the human visual system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
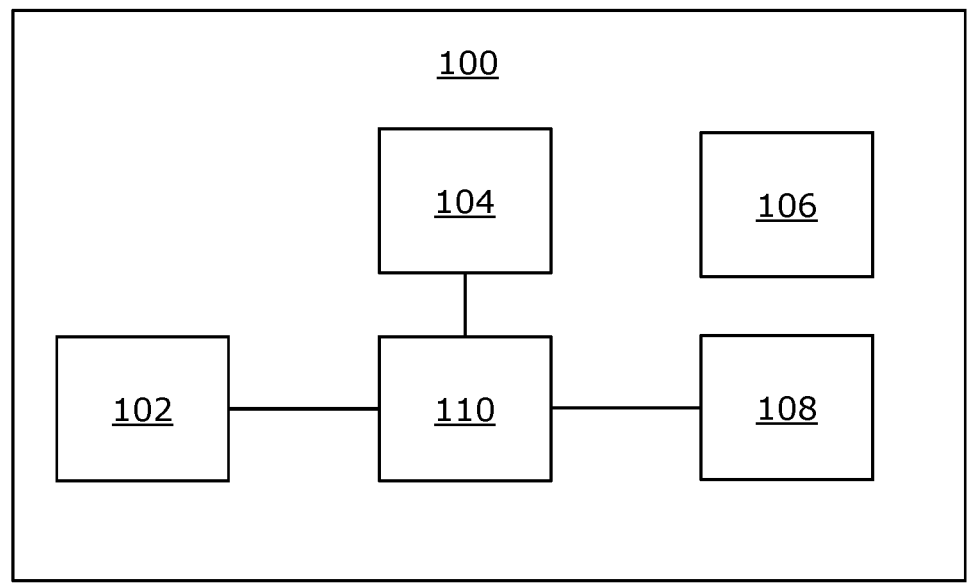
FIG. 1 is a block diagram of architecture of a direct retinal projection apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a direct retinal projection apparatus comprising:

means for detecting a gaze direction of a user;

at least one projector;

at least one first optical element comprising at least a first optical portion and a second optical portion having different optical properties with respect to magnification;

at least one first actuator associated with the at least one first optical element; and a processor configured to render a warped image having a spatially-uniform angular resolution via the at least one projector, whilst adjusting an orientation of the at least one first optical element via the at least one first actuator, based on the detected gaze direction of the user, to direct a projection of the warped image from the at least one first optical element towards a retina of a user's eye, wherein projections of a first portion and a second portion of the warped image are differently magnified by the first optical portion and the second optical portion of the at least one first optical element, respectively, to produce on the retina of the user's eye a de-warped image having a spatially-variable angular resolution.

In another aspect, an embodiment of the present disclosure provides a method of displaying, via a direct retinal projection apparatus comprising at least one projector and at least one first optical element, the method comprising:

detecting a gaze direction of a user;

rendering a warped image having a spatially-uniform angular resolution via the at least one projector; and adjusting an orientation of the at least one first optical element, based on the detected gaze direction of the user, to direct a projection of the warped image from the at least one first optical element towards a retina of a user's eye, wherein the at least one first optical element comprises at least a first optical portion and a second optical portion having different optical properties with respect to magnification, and wherein projections of a first portion and a second portion of the warped image are differently magnified by the first optical portion and the second optical portion of the at least one first optical element, respectively, to produce on the retina of the user's eye a de-warped image having a spatially-variable angular resolution.

Optionally, the step of rendering and the step of adjusting are performed simultaneously. Alternatively, optionally, the step of rendering is performed just after the step of adjusting.

In the projection apparatus, optical properties and/or an optical path of the projection of the rendered image are adjusted by way of sophisticated equipment for emulating foveation characteristics of the human visual system accurately. Beneficially, the projection apparatus is suitable for directing a narrow foveated projection of the rendered image towards the retina of the user's eye, thereby providing the user with a high-resolution visual scene of a simulated environment even with a low-resolution projector having a spatially-uniform resolution.

Moreover, the aforesaid projection apparatus is compact and lightweight. Furthermore, the aforesaid method is implemented in real-time or near-real time. Notably, the projection apparatus has a negligible processing lag, and provides the user with a rich immersive experience of the simulated environment.

Pursuant to embodiments of the present disclosure, the orientation of the at least one first optical element is adjusted according to the detected gaze direction of the user, thereby following the user's gaze as and when it changes. As a result, the de-warped image is produced on the retina of the user's eye even when the user's gaze keeps shifting. The aforementioned projection apparatus provides the user with a visual scene in a gaze-contingent variable-resolution manner, wherein the angular resolution of a first portion of the de-warped image is lower than the angular resolution of a second portion of the de-warped image; the first portion and the second portion of the de-warped image being produced from the first portion and the second portion of the warped image, respectively. In this regard, the aforementioned method allocates computational resources for image production preferentially to an area around the center of gaze (namely, at and around the fovea of the user's eyes), where visual sensitivity to detail is the greatest. This potentially reduces the amount of computational resources required for producing the de-warped image, as a high level of detail is only required to be maintained in a small area around the center of gaze.

Throughout the present disclosure, the term "second portion of the de-warped image" refers to a region of interest of the de-warped image at which the user is gazing, whereas the term "first portion of the de-warped image" refers to a remaining region of the de-warped image or a part of the remaining region. In other words, the second portion of the de-warped image is a portion of the de-warped image that is formed on and around the fovea of the user's eye, whereas the first portion of the de-warped image is a portion of the de-warped image that is formed on a remaining part of the retina of the user's eye. Beneficially, the angular resolution of the second portion of the de-warped image is comparable to a normal human-eye resolution. Therefore, the de-warped image having such a spatially-variable angular resolution mimics foveation characteristics of the human visual system.

Optionally, the angular resolution decreases on going from the center of the second portion of the de-warped image towards an edge of the de-warped image linearly, non-linearly or in a step-wise manner. Throughout the present disclosure, the term "angular resolution" of a given image or its portion refers to a number of pixels per degree (namely, points per degree (PPD)) of an angular width of the given image or its portion, wherein the angular width is measured from the perspective of the user's eye. Notably, an increase in the angular resolution results in an increase in the number of pixels per degree and a decrease in an angular pixel size.

Optionally, an angular resolution of the first portion of the de-warped image with respect to the user's eye lies in a range of 5 to 30 pixels per degree. For example, the angular resolution of the first portion of the de-warped image may be from 5, 10, 15, 20 or 25 pixels per degree up to 10, 15, 20, 25 or 30 pixels per degree. Optionally, an angular resolution of the second portion of the de-warped image with respect to the user's eye lies in a range of 30 to 100 pixels per degree. For example, the angular resolution of the second portion of the de-warped image may be from 30, 40, 50, 60, 70, 80 or 90 pixels per degree up to 40, 50, 60, 70, 80, 90 or 100 pixels per degree.

Optionally, an angular width of the first portion of the de-warped image with respect to the user's eye lies in a range of 40 degrees to 220 degrees. Moreover, optionally an angular width of the second portion of the de-warped image with respect to the user's eye lies in a range of 5 degrees to 60 degrees. For example, the angular width of the first portion of the de-warped image may be 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees. Likewise, the angular width of the second portion of the de-warped image may be from 5, 10, 15, 20, 25, 30, 35, 40, 45, 50 or 55 degrees up to 10, 15, 20, 25, 30, 35, 40, 45, 50, 55 or 60 degrees.

Throughout the present disclosure, the term "angular width" refers to an angular width of a given portion of a given image as measured from the perspective of the user's eye. It will be appreciated that the angular width of the first portion of the de-warped image is greater than the angular width of the second portion of the de-warped image, as the first portion of the de-warped image is projected upon the retina of the user's eyes, whereas the second portion of the de-warped image is projected on and around the fovea of the user's eyes.

Moreover, throughout the present disclosure, by the phrase "differently magnified", any of the following is meant:

the first optical portion would magnify the projection of the first portion of the warped image to produce the first portion of the de-warped image, while the second optical portion would de-magnify the projection of the second portion of the warped image to produce the second portion of the de-warped image;

both the first optical portion and the second optical portion would de-magnify the projections of the first portion and the second portion of the warped image to produce the first portion and the second portion of the de-warped image, respectively, wherein a de-magnification factor of the second optical portion is greater than a de-magnification factor of the first optical portion;

the first optical portion would magnify the projection of the first portion of the warped image to produce the first portion of the de-warped image, while the second optical portion would neither magnify nor de-magnify the projection of the second portion of the warped image to produce the second portion of the de-warped image;

the first optical portion would neither magnify nor de-magnify the projection of the first portion of the warped image to produce the first portion of the de-warped image, while the second optical portion would de-magnify the projection of the second portion of the warped image to produce the second portion of the de-warped image; or both the first optical portion and the second optical portion would magnify the projections of the first portion and the second portion of the warped image to produce the first portion and the second portion of the de-warped image, respectively, wherein a magnification factor of the first optical portion is greater than a magnification factor of the second optical portion.

Throughout the present disclosure, the term "magnification factor" refers to an extent to which a given portion of the warped image is enlarged by a given optical portion of the at least one first optical element, while the term "de-magnification factor" refers to an extent to which a given portion of the warped image is shrunk by a given optical portion of the at least one first optical element.

It will be appreciated that when incident upon the first optical portion and the second optical portion of the at least one first optical element, the projections of the first portion and the second portion of the warped image are differently magnified and directed (namely, reflected and/or passed) towards the retina of the user's eyes, either directly or indirectly, to produce the first portion and the second portion of the de-warped image, respectively. By "directly", it is meant that in some implementations, there is no second optical element between the at least one first optical element and the user's eye, and the at least one first optical element directs the projection of the de-warped image towards the retina of the user's eye. Examples of such an implementation have been provided in conjunction with FIGS. 3, 4, 5 and 6. On the other hand, by "indirectly", it is meant that in other implementations, the at least one first optical element directs the projection of the de-warped image towards at least one second optical element from where said projection is then directed towards the retina of the user's eye. Examples of such an implementation have been provided in conjunction with FIGS. 7 and 8, for example, as described below. Optionally, in such an implementation, the projection apparatus further comprises at least one second optical element arranged on the optical path between the at least one first optical element and the user's eye, wherein the processor is configured to:

determine, based on the detected gaze direction of the user, a given portion of the at least one second optical element at or through which the user is gazing; and adjust the orientation of the at least one first optical element via the at least one first actuator to direct the projection of the second portion of the warped image, optically de-warped by the second optical portion of the at least one first optical element, towards the given portion of the at least one second optical element from where said projection is directed towards a fovea of the user's eye.

It will be appreciated that in the at least one first optical element, the second optical portion is surrounded at least partially by the first optical portion. Moreover, optionally, the at least one first optical element further comprises at least one intermediary optical portion between the first optical portion and the second optical portion, the at least one intermediary optical portion having different optical properties with respect to magnification as compared to the first optical portion and the second optical portion. Notably, the at least one intermediary optical portion could comprise a single intermediary optical portion or a plurality of intermediary optical portions. Throughout the present disclosure, the term "intermediary optical portion" refers to a portion of the at least one first optical element that surrounds the second optical portion and is surrounded by the first optical portion.

Throughout the present disclosure, by the phrase "different optical properties with respect to magnification", it is meant that the first optical portion and the second optical portion, and optionally, the at least one intermediary optical portion have different magnification and/or de-magnification properties, and are capable of selectively magnifying and/or de-magnifying projections of different portions of the warped image rendered via the at least one projector. As an example, each of the first optical portion, the second optical portion and the at least one intermediary optical portion may de-magnify the projections of the different portions of the warped image, wherein a de-magnification factor of the at least one intermediary optical portion is greater than the de-magnification factor of the first optical portion, but smaller than the de-magnification factor of the second optical portion. As another example, the at least one intermediary optical portion may neither magnify nor de-magnify a projection of an intermediary portion of the warped image (namely, a portion between the first portion and the second portion of the warped image), while the first optical portion and the second optical portion may, respectively, magnify and de-magnify the projections of the first portion and the second portion of the warped image.

Throughout the present disclosure, the term "projections of the first portion and the second portion of the warped image" refers to a collection of light rays emanating from the at least one projector when the warped image is rendered therefrom. The projections of the first portion and the second portion of the warped image (namely, the collection of light rays) may transmit through and/or reflect from various components of the projection apparatus, including the at least one first optical element, before reaching the user's eye. For purposes of embodiments of the present disclosure, the term "projections of the first portion and the second portion of the warped image" has been used consistently, irrespective of whether the collection of light rays is transmitted or reflected.

Optionally, the de-magnification factor and/or the magnification factor of the aforementioned optical portions of the at least one first optical element is to vary spatially according to a transfer function. Optionally, in this regard, the de-magnification factor and/or the magnification factor of the different optical portions of the at least one first optical element is to vary from a center of the second optical portion towards an edge of the at least one first optical element according to the transfer function.

In some implementations, the at least one first optical element is asymmetrical with respect to its optical axis. Optionally, in such a case, the first optical portion and the second optical portion are positioned asymmetrically with respect to the optical axis of the at least one first optical element. One such asymmetrical first optical element has been illustrated in conjunction with FIGS. 13A and 13B.

In a first embodiment, the at least one first optical element comprises an asymmetric mirror. Optionally, in this regard, the asymmetric mirror is implemented as a free-form mirror. Notably, a reflective surface of the free-form mirror is a combination of flat and curved surfaces. Moreover, asymmetric radii of curvature of such flat and curved surfaces account for the free-form shape of the free-form mirror. Such curved surfaces can also be described using their conic constants. As an example, a first optical portion and a second optical portion of the free-form mirror may be implemented as two spherical mirrors having radii of curvatures approximately equal to 600 millimeters and 1200 millimeters, respectively. In such a case, curvatures of such spherical mirrors would be smoothly matched to form a continuous reflective surface of the free-form mirror. In other words, a profile of the free-form mirror is smooth and continuous.

In a second embodiment, the at least one first optical element comprises at least one plane mirror and an asymmetric lens. In such a case, the asymmetric lens comprises the aforesaid first optical portion and the aforesaid second optical portion that have different optical properties with respect to magnification. Optionally, in this regard, the asymmetric lens is implemented as a free-form lens. Moreover, optionally, the at least one plane mirror is arranged on the optical path between the at least one projector and the asymmetric lens. Alternatively, optionally, the asymmetric lens is arranged on the optical path between the at least one projector and the at least one plane mirror.

In a third embodiment, the at least one first optical element comprises at least one plane mirror and a diffractive lens. In such a case, the diffractive lens comprises the aforesaid first optical portion and the aforesaid second optical portion that have different optical properties with respect to magnification. Optionally, the at least one plane mirror is arranged on the optical path between the at least one projector and the diffractive lens. Alternatively, optionally, the diffractive lens is arranged on the optical path between the at least one projector and the at least one plane mirror.

In a fourth embodiment, the at least one first optical element comprises a prism with at least one free-form reflective surface. In such a case, the at least one free-form reflective surface comprises the aforesaid first optical portion and the aforesaid second optical portion that have different optical properties with respect to magnification.

In a fifth embodiment, the at least one first optical element comprises an asymmetric lens. The asymmetric lens comprises the aforesaid first optical portion and the aforesaid second optical portion that have different optical properties with respect to magnification.

In other implementations, the at least one first optical element is symmetrical with respect to its optical axis. Optionally, in such a case, the second optical portion surrounds an optical center of the at least one first optical element, while the first optical portion surrounds the second optical portion. One such symmetrical first optical element has been illustrated in conjunction with FIGS. 12A and 12B.

In a sixth embodiment, the at least one first optical element comprises a symmetric mirror. In such a case, the symmetric mirror comprises the aforesaid first optical portion and the aforesaid second optical portion that have different optical properties with respect to magnification. More optionally, the symmetric mirror is implemented as an aspheric mirror. Optionally, in this regard, a reflective surface of the aspheric mirror has a complex surface profile that does not include portions of a sphere or a cylinder. The complex surface profile of the reflective surface of the aspheric mirror is defined by aspheric coefficients, conic coefficients and a radius of curvature of the reflective surface. Beneficially, the aspheric mirror allows for correction of spherical aberration within the projection apparatus. Additionally, the complex surface profile of the aspheric mirror also allows for increasing an apparent field of view (FOV) of the projection apparatus.

In a seventh embodiment, the at least one first optical element comprises at least one plane mirror and a symmetric lens. In such a case, the symmetric lens comprises the aforesaid first optical portion and the aforesaid second optical portion that have different optical properties with respect to magnification. Optionally, in this regard, the symmetric lens is implemented as an aspheric lens. Moreover, optionally, the at least one plane mirror is arranged on the optical path between the at least one projector and the symmetric lens. Alternatively, optionally, the symmetric lens is arranged on the optical path between the at least one projector and the at least one plane mirror.

In an eighth embodiment, the at least one first optical element comprises a symmetric lens. The symmetric lens comprises the aforesaid first optical portion and the aforesaid second optical portion that have different optical properties with respect to magnification.

It will be appreciated that in the aforementioned first, second, third, fourth, sixth and seventh embodiments, the at least one first optical element has at least one reflective surface. In these embodiments, when incident upon the first optical portion and the second optical portion of the at least one first optical element, the projections of the first portion and the second portion of the warped image are differently magnified and reflected towards the retina of the user's eyes. On the other hand, in the fifth and eight embodiments, the projections of the first portion and the second portion of the warped image, upon being differently magnified, pass through the aforesaid lens towards the retina of the user's eyes.

Thus, optionally, the at least one first optical element comprises any of:
an asymmetric mirror,
at least one plane mirror and an asymmetric lens,
at least one plane mirror and a diffractive lens,
a prism with at least one free-form reflective surface,
an asymmetric lens,
a symmetric mirror,
at least one plane mirror and a symmetric lens,
a symmetric lens.

Furthermore, optionally, the aforesaid mirrors are implemented as at least one of: a reflective liquid lens, a reflective LC lens, a reflective membrane. It will be appreciated that a given lens can be implemented as a single complex lens or a configuration of multiple lenses, so as to achieve the aforesaid optical properties with respect to magnification.

Moreover, optionally, the processor or an imaging unit communicably coupled to the processor is configured to generate the warped image based on the optical properties of the first optical portion and the second optical portion.

Additionally, optionally, the processor or the imaging unit is configured to generate the warped image based on the detected gaze direction of the user. It will be appreciated that said means is employed to detect the gaze direction of the user repeatedly over a period of time, when the projection apparatus in operation is worn by the user. Optionally, the processor or the imaging unit is configured to generate a sequence of warped images, based upon instantaneous gaze directions of the user detected during operation, in real-time or near real-time.

Furthermore, optionally, the processor is configured to adjust a rotational orientation of the at least one first optical element to align the first optical portion and the second optical portion with the first portion and the second portion of the warped image rendered via the at least one projector. In other words, the rotational orientation of the first optical portion and the second optical portion are adjusted according to the detected gaze direction of the user. When the first optical portion and the second optical portion of the at least one first optical element are aligned with the first portion and the second portion of the warped image rendered via the at least one projector, the projections of the first portion and the second portion of the warped image are differently magnified by the first optical portion and the second optical portion, respectively, to produce the first portion and the second portion of the de-warped image on the retina of the user's eye.

Optionally, in implementations where the at least one first optical element is asymmetrical, if the at least one first optical element is rotatable in only one direction, an angle of rotation of the at least one first optical element lies within a range of 0 degrees to 360 degrees; otherwise, if the at least one first optical element is rotatable in both the directions, the angle of rotation of the at least one first optical element lies within a range of 0 degrees to 180 degrees.

Optionally, in implementations where the at least one first optical element is symmetrical, if the at least one first optical element is rotatable in only one direction, the angle of rotation of the at least one first optical element lies within a range of 0 degrees to 180 degrees; otherwise, if the at least one first optical element is rotatable in both the directions, the angle of rotation of the at least one first optical element lies within a range of 0 degrees to 90 degrees.

In operation, the aforesaid sequence of warped images is rendered via the at least one projector, while the at least one first optical element is rotated to orient the first optical portion and the second optical portion according to the instantaneous gaze directions of the user. Upon being differently magnified, projections of different portions of these warped images produce a sequence of de-warped images having spatially-variable angular resolutions. The sequence of de-warped images creates the visual scene of the simulated environment that is presented to the user.

Pursuant to an embodiment of the present disclosure, the detected gaze direction of the user is taken into consideration during the generation of the warped image as well as while adjusting the rotational orientation of the at least one first optical element. This enables the accurate alignment of the first optical portion and the second optical portion of the at least one first optical element with the first portion and the second portion of the warped image, respectively. When aligned with the first portion and the second portion of the warped image, the first optical portion and the second optical portion of the at least one first optical element apply a de-warping effect that is an inverse of a warping effect that was applied during the generation of the warped image.

Notably, the de-warped image is desired to be made visible to the user only when a perfect or near-perfect alignment between the at least one first optical element and the warped image (rendered via the at least one projector) is achieved according to the detected gaze direction of the user. Optionally, in this regard, the processor is configured to determine a given instant of time at which the de-warped image is to be made visible to the user, based on:

a given rotational speed of the at least one first optical element about its optical axis, a direction of rotation of the at least one first optical element, and a previous rotational orientation of the at least one first optical element.

Beneficially, the given instant of time at which the de-warped image is to be made visible to the user corresponds to a moment in time at which the first optical portion and the second optical portion of the at least one first optical element would optimally align, respectively, with the first portion and the second portion of the warped image (rendered via the at least one projector) while the at least one first optical element is rotating about its optical axis. Consequently, various instants of time at which individual de-warped images of the sequence of de-warped images are to be made visible to the user are spaced unequally in time. It will be appreciated that the human visual system is not capable of discerning any unevenness (namely, flicker) in a timed rendering of the sequence of de-warped images, namely when the user views the sequence of de-warped images produced on the retina of the user's eye.

Optionally, the processor is configured to determine a time duration for which the de-warped image is to be made visible to the user, based upon the given rotational speed of the at least one first optical element.

Typically, a perfect or near-perfect alignment of the first optical portion and the second optical portion of the at least one first optical element with the first portion and the second portion of the warped image, respectively, is only momentary. Therefore, the de-warped image is to be made visible to the user for a time duration in which the aforesaid alignment is perfect or near-perfect. During this time duration, a slight change in the aforesaid alignment is miniscule, and therefore, a corresponding slight change in an appearance of the de-warped image is imperceptible to the user. Notably, the time duration for which the de-warped image is to be made visible to the user varies inversely with the given rotational speed of the at least one first optical element. In other words, at high rotational speeds, the time duration for achieving a perfect or near-perfect alignment of the at least one first optical element with the warped image would be extremely short.

Optionally, the time duration for which the de-warped image is to be made visible lies in a range of 0.2 microseconds to 2 microseconds. Such a time duration is desired to be short enough to allow the de-warped image to be made visible precisely during the perfect or near-perfect alignment of the at least one first optical element with the warped image, whilst also being long enough to allow the user to view the de-warped image properly. Beneficially, the time duration is suitably selected to avoid any visual artefacts or optical distortions that the at least one first optical element would introduce during the rotation. For example, the time duration for which the de-warped image is to be made visible may be 0.2, 0.3, 0.4, 0.5, 0.6, 0.7, 0.8, 0.9, 1, 1.1, 1.2, 1.3, 1.4, 1.5, 1.6, 1.7, 1.8 or 1.9 microseconds up to 0.3, 0.4, 0.5, 0.6, 0.7, 0.8, 0.9, 1, 1.1, 1.2, 1.3, 1.4, 1.5, 1.6, 1.7, 1.8, 1.9 or 2 microseconds. As an example, the time duration for which the de-warped image is to be made visible may be 0.27 microseconds. In such a case, if the at least one first optical element is rotating at the rotational speed of 100 rotations per second, a given point on the at least one first optical element would cover a rotational distance of 0.01 degrees along the rotational trajectory. As another example, the time duration for which the de-warped image is to be made visible may be 1.7 microseconds.

Furthermore, according to an embodiment, the at least one projector is to be switched on or brightened at the given instant of time. At the given instant of time, the first optical portion and the second optical portion of the at least one first optical element are optimally aligned with the first portion and the second portion of the warped image, respectively, thereby enabling optical de-warping of the warped image to produce the de-warped image on the retina of the user's eyes.

Additionally, optionally, the at least one projector is to be kept switched-on or brightened throughout the aforesaid time duration starting from the given instant of time. After the time duration elapses, the at least one projector is switched off or dimmed, until the at least one projector is required to be switched on or brightened for rendering a next warped image. In this way, the at least one projector is controlled to perform the timed rendering of the sequence of warped images.

According to another embodiment, the projection apparatus further comprises an optical filter arranged on an optical path between the at least one projector and the user's eye, wherein the processor is configured to control the optical filter to allow the projections of the first portion and the second portion of the warped image to pass through the optical filter at the given instant of time.

Hereinabove, the term "optical filter" refers to a device that, when controlled, either allows or prevents transmission of light therethrough. Therefore, when arranged as described above, the optical filter either allows or prevents transmission of the projection of the warped image emanating from the at least one projector. Beneficially, the optical filter allows the projection of the warped image to pass therethrough at the given instant of time and for the aforesaid time duration. The optical filter can be implemented as an optical chopper, a leaf shutter, an electronic shutter and the like.

Optionally, when generating the warped image, the processor or the imaging unit is configured to adjust an intensity of the first portion and the second portion of the warped image in a manner that, upon being differently magnified, the projections of the first portion and the second portion of the warped image produce on the retina of the user's eye the de-warped image that appears to have a uniform brightness thereacross. As a result, the first portion and the second portion of the de-warped image have similar brightness, and the user is not able to perceive any abrupt transition between the first portion and the second portion. If the intensity of the first portion and the second portion of the warped image were not adjusted, pixels of the second portion of the de-warped image would be brighter than pixels of the first portion of the de-warped image.

According to an embodiment, the imaging unit is a computer that is configured to generate computer graphics.

According to another embodiment, the imaging unit comprises at least one camera and at least one warping optical element. Optionally, the at least one warping optical element comprises a first warping portion and a second warping portion, wherein optical properties of the first warping portion and the second warping portion of the at least one warping optical element are substantially inverse of the optical properties of the first optical portion and the second optical portion of the at least one first optical element, respectively. By "substantially inverse", it is meant that the first and second portions of the warped image (that were generated using the first warping portion and the second warping portion), when rendered via the at least one projector, can be optically de-warped by the first optical portion and the second optical portion of the at least one first optical element, respectively, to produce the first portion and the second portion of the de-warped image.

Optionally, in such a case, projections of a first region and a second region of a given real-world scene are differently magnified by the first warping portion and the second warping portion of the at least one warping optical element and captured as the first portion and the second portion of the warped image, respectively. Optionally, in this regard, a number of pixels employed for capturing a particular angular width (namely, the PPD) of the second region of the given real-world scene is greater than a number of pixels employed for capturing that particular angular width (namely, the PPD) of the first region of the given real-world scene.

Optionally, in this regard, the imaging unit further comprises:

at least one actuator attached to a base that supports the at least one warping optical element and the at least one camera; and a processor coupled to the at least one camera and the at least one actuator, wherein the processor is configured to:

receive, from the projection apparatus, information indicative of a current head orientation and gaze direction of the user; and control the at least one actuator to adjust an orientation of the at least one warping optical element and the at least one camera, based upon the current head orientation and gaze direction of the user.

Optionally, the imaging unit is comprised in the projection apparatus. The imaging unit is positioned in a proximity of the user's eyes, so as to enable capturing of the warped images from a perspective of the user's eyes. Thus, when the projection apparatus is worn by the user, the imaging unit, in operation, captures the warped images of the real-world environment surrounding the user.

Alternatively, optionally, the imaging unit is mounted on an external device that is remote to the projection apparatus. As an example, the external device may be implemented as a robot, a drone, a vehicle or similar.

Optionally, the projection apparatus further comprises means for tracking a head orientation of the user, wherein the processor or the imaging unit is configured to generate the warped image based on the head orientation of the user. Throughout, the present disclosure, the term "means for tracking a head orientation" refers to specialized equipment for detecting and optionally, following the orientation of the user's head, when the projection apparatus is worn by the user. Optionally, said means is implemented as a gyroscope and an accelerometer.

Optionally, the projection apparatus comprises a memory unit coupled to the processor, wherein the memory unit is employed to store a sequence of warped images. Such a sequence of warped images is stored in an image format that is compatible with the at least one projector. Examples of the image format include, but are not limited to, Joint Photographic Experts Group (JPEG), Tagged Image File Format (TIFF), Portable Network Graphics (PNG), Graphics Interchange Format (GIF) and Bitmap file format (BMP).

There will now be described various components of the projection apparatus. Referring now to the means for detecting the gaze direction of the user, it will be appreciated that said means may or may not be placed in contact with the user's eye. Optionally, said means comprises a configuration of gaze sensors. Such a configuration of gaze sensors may, for example, be implemented as sensors within contact lenses, cameras monitoring a position of a pupil of the user's eye, and an eye-surface-scanning laser and its associated camera. In such a case, the processor is configured to process sensor data collected by the configuration of gaze sensors to determine a current gaze location and a current gaze velocity and/or acceleration of the user.

Optionally, the processor is configured to predict a gaze location and a gaze velocity and/or acceleration of the user, based at least partially on the current gaze location and the current gaze velocity and/or acceleration. Additionally, optionally, the processor is configured to predict the gaze location and the gaze velocity and/or acceleration of the user, based also on scene information pertaining to the sequence of warped images being rendered. Optionally, in this regard, the scene information comprises information indicative of a location of an object present in the visual scene that has at least one of: an audio feature of interest, a visual feature of interest, a physical interaction with another object present in the visual scene. Notably, if the object has audio features of interest, visual features of interest, physical interactions with other objects, and so forth, there exists a high likelihood that the user's gaze would be directed towards such an object, as such characteristics generally attract the user's attention.

Moreover, optionally, the processor is configured to adjust the orientation of the at least one first optical element via the at least one first actuator, based on the predicted gaze location and the predicted gaze velocity and/or acceleration, to direct a projection of a next warped image (rendered via the at least one projector) from the at least one first optical element towards the retina of the user's eye. Optionally, when the projection of the next warped image is to be directed (namely, reflected and/or passed) from the at least one first optical element towards the retina of the user's eyes indirectly, the processor is configured to determine, based on the predicted gaze location and the predicted gaze velocity and/or acceleration, a next region of the at least one second optical element at or through which the user is likely to gaze, and to control the at least one first actuator accordingly.

Optionally, the projection apparatus further comprises at least one second actuator associated with the at least one projector, wherein the processor is configured to adjust an orientation of the at least one projector with respect to the at least one first optical element via the at least one second actuator.

Optionally, the at least one first actuator and/or the at least one second actuator are tiltable, rotatable and/or translatable in one or more dimensions. More optionally, the at least one second actuator is tiltable along at least one axis, and the at least one first actuator is tiltable along at least one orthogonal axis. Herein, the at least one orthogonal axis is orthogonal to the at least one axis.

Throughout the present disclosure, the term "actuator" refers to an equipment that is employed to rotate, tilt and/or translate a component with which it is associated. Such equipment may, for example, include electrical components, mechanical components, magnetic components, polymeric components and so forth. Such an actuator is driven by an actuation signal. It will be appreciated that the actuation signal could be a piezoelectric force, an electromagnetic force, a mechanical torque, an electric current, a hydraulic pressure, a pneumatic pressure or similar. As an example, the actuator may comprise a motor, an axle and a plurality of bearings (for example, three or more bearings). As another example, the actuator may comprise a voice coil. As yet another example, the actuator may comprise piezo-electronic components.

Furthermore, optionally, in implementations where the projection of the warped image is to be directed from the at least one first optical element towards the retina of the user's eyes indirectly, the at least one second optical element is implemented as at least one of: one or more lenses, one or more mirrors, a prism, a beam splitter, an optical waveguide, a polarizer.

When the at least one second optical element is implemented as a configuration of lenses, said configuration may, for example, comprise at least one of: a convex lens, a planoconvex lens, a concave lens, a planoconcave lens, a Liquid Crystal (LC) lens, a liquid lens, a Fresnel lens, an achromatic lens, a meniscus lens, a nano-grating lens. Such lenses can be made from various suitable materials, for example, such as glass, plastics, polycarbonate materials, active polymers, flexible membranes and the like.

Moreover, optionally, a surface of the at least one second optical element that faces the user's eye (when the projection apparatus in operation is worn by the user) is planar. Alternatively, optionally, said surface is curved. More optionally, said surface is concave in shape.

Optionally, a curvature of the at least one second optical element is dynamically changeable. Optionally, in this regard, the at least one second optical element is made of an active polymer or a flexible membrane. Such an active polymer or a flexible membrane is controllable by a given drive signal, for example, such as a voltage signal. Such active polymers can be amorphous, elastomeric, semi-crystalline or liquid crystalline, and can be activated in response to heat, light, and/or an electrical field. Optionally, the active polymer or the flexible membrane is actuated by the given signal to change the shape of the aforesaid surface of the at least one second optical element.

Optionally, the at least one second optical element comprises a semi-transparent reflective element. As an example, the semi-transparent reflective element may be implemented as a semi-transparent mirror. As another example, the semi-transparent reflective element may be implemented as a prism having a semi-transparent reflective coating on at least one face of the prism. Optionally, when the projection apparatus is switched off or is operating in an optical see-through mode, the semi-transparent reflective element allows the user to see the surrounding real-world environment therethrough. In such a case, the projection apparatus acts as an optical see-through device.

Alternatively, optionally, the at least one second optical element is implemented as a telescope-like lens that focuses the projection of the de-warped image onto the retina of the user's eye. It will be appreciated that such a telescope-like lens is capable of focusing a projection of the surrounding real-world environment onto the user's eye, thereby allowing the user to see the surrounding real-world environment. Moreover, optionally, the telescope-like lens comprises a semi-transparent reflective element along with at least one of: a planoconcave lens, a concave lens, a planoconvex lens, a convex lens, a meniscus lens, a Fresnel lens. It will be appreciated that the telescope-like lens is not limited to any particular type, number or arrangement of such lenses. The semi-transparent reflective element may be planar or curved. In operation, the semi-transparent reflective element reflects the projection of the de-warped image received from the at least one first optical element towards the user's eye. The telescope-like lens allows the user to see her/his surrounding real-world environment, for example, when the projection apparatus is switched off or is operating in the optical see-through mode.

Yet alternatively, optionally, the at least one second optical element comprises a non-transparent reflective element. In such a case, the projection apparatus operates in a video see-through mode or a full VR mode.

Still alternatively, optionally, the at least one second optical element comprises an electrically-controllable polarizer. Optionally, in such a case, the processor is configured to control said polarizer to toggle between the optical see-though mode and the video see-through mode.

Yet alternatively, optionally, the at least one second optical element comprises a single lens. Such a single lens may be implemented as an eyepiece. In such a case, the projection apparatus operates in the video see-through mode or the full VR mode.

Optionally, the at least one projector is selected from the group consisting of: an LCD-based projector, an LED-based projector, an OLED-based projector, an LCoS-based projector, a Digital Light Processing (DLP)-based projector, and a laser projector.

Moreover, in some implementations, the at least one projector comprises separate projectors for left and right eyes of the user. Two such example implementations have been illustrated in conjunction with FIGS. 3 and 5.

In other implementations, the at least one projector comprises a single projector that is employed for both the left and right eyes of the user on a shared basis. This potentially reduces the cost of the aforesaid projection apparatus, whilst making the projection apparatus more compact and more energy efficient, as compared to a case where the projection apparatus has separate projectors for the left and right eyes of the user. Two such example implementations have been illustrated in conjunction with FIGS. 6 and 8 as explained in detail below. Optionally, in such an implementation, the at least one first optical element further comprises a plurality of first optical elements. An orientation of at least one of the plurality of first optical elements is adjusted, based on the detected gaze direction of the user.

Optionally, at least one first of the plurality of first optical elements is semi-transparent and is arranged to partially reflect the projection of the warped image towards at least one second of the plurality of first optical elements. Moreover, optionally, the at least one first of the plurality of first optical elements partially allows the projection of the warped image to pass therethrough towards at least one third of the plurality of first optical elements, which then reflects said projection towards at least one fourth of the plurality of first optical elements.

Optionally, the at least one first of the plurality of first optical elements and the at least one third of the plurality of first optical elements are implemented as a fold mirror. Optionally, in this regard, the at least one first of the plurality of first optical elements and the at least one third of the plurality of first optical elements are implemented as a 50/50 semi-reflective mirror and a fully-reflective mirror, respectively. Herein, the term "50/50 semi-reflective mirror" refers to a mirror that reflects 50 percent of incident light, whilst transmitting 50 percent of the incident light at least theoretically. Likewise, the term "fully-reflective mirror" refers to a mirror that reflects 100 percent of incident light at least theoretically.

Alternatively, optionally, the at least one first of the plurality of first optical elements and the at least one third of the plurality of first optical elements are implemented as two surfaces of a prism.

The processor is coupled to the means for detecting the gaze direction, the at least one projector and the at least one first actuator. The processor is configured to control various operations of said means, the at least one projector and the at least one first actuator, as described earlier.

Moreover, optionally, the projection apparatus further comprises a light-sensing element for sensing the intensity of light pulses emitted by the at least one projector and means for stopping the light pulses from reaching the user's eye. Optionally, in this regard, the processor is configured to obtain information indicative of the intensity of the light pulses, and to detect when the intensity of the light pulses exceeds a predefined threshold value. Optionally, the processor is configured to use said means to stop the light pulses when the intensity of the light pulses exceeds the predefined threshold value. The predefined threshold value may be a default value that is preset in the projection apparatus. Such predefined threshold values are based upon commonly known and practiced eye-safety guidelines. Optionally, the means for stopping the light pulses is implemented as at least one of: an opaque shutter, an interlock mechanism associated with a light source of the at least one projector, a glass filter, a polycarbonate filter.

The present disclosure also relates to the method as described above. Various embodiments and variants disclosed above apply mutatis mutandis to the method.

Optionally, the method further comprises generating the warped image based on the optical properties of the first optical portion and the second optical portion. Additionally, optionally, the method further comprises generating the warped image based on the detected gaze direction of the user.

Optionally, the method further comprises:
tracking a head orientation of the user; and
generating the warped image based on the head orientation of the user.

Optionally, the step of generating the warped image comprises adjusting an intensity of the first portion and the second portion of the warped image in a manner that, upon being differently magnified, the projections of the first portion and the second portion of the warped image produce on the retina of the user's eye the de-warped image that appears to have a uniform brightness thereacross.

Moreover, optionally, the method further comprises adjusting a rotational orientation of the at least one first optical element to align the first optical portion and the second optical portion with the first portion and the second portion of the warped image rendered via the at least one projector.

Optionally, in this regard, the method further comprises determining a given instant of time at which the de-warped image is to be made visible to the user, based on:
a given rotational speed of the at least one first optical element about its optical axis,
a direction of rotation of the at least one first optical element, and
a previous rotational orientation of the at least one first optical element.

Additionally, optionally, the method further comprises determining a time duration for which the de-warped image is to be made visible to the user, based upon the given rotational speed of the at least one first optical element.

According to an embodiment, the method further comprises switching on or brightening the at least one projector at the given instant of time. According to another embodiment, the projection apparatus further comprises an optical filter arranged on an optical path between the at least one projector and the user's eye, wherein the method further comprises controlling the optical filter to allow the projections of the first portion and the second portion of the warped image to pass through the optical filter at the given instant of time.

Furthermore, the projection apparatus further comprises at least one second optical element arranged on an optical path between the at least one first optical element and the user's eye. Optionally, in such a case, the method further comprises:
determining, based on the detected gaze direction of the user, a given portion of the at least one second optical element at or through which the user is gazing; and
adjusting the orientation of the at least one first optical element to direct the projection of the second portion of the warped image, optically de-warped by the second optical portion of the at least one first optical element, towards the given portion of the at least one second optical element from where said projection is directed towards a fovea of the user's eye.

Moreover, optionally, the at least one first optical element comprises any of:
an asymmetric mirror,
at least one plane mirror and an asymmetric lens,
at least one plane mirror and a diffractive lens,
a prism with at least one free-form reflective surface,
an asymmetric lens,
a symmetric mirror,
at least one plane mirror and a symmetric lens,
a symmetric lens.

DETAILED DESCRIPTION OF THE DRAWINGS

Referring to FIG. 1, illustrated is a block diagram of architecture of a direct retinal projection apparatus 100, in accordance with an embodiment of the present disclosure. The projection apparatus 100 comprises means 102 for detecting a gaze direction of a user, at least one projector (depicted as a projector 104), at least one first optical element (depicted as a first optical element 106), at least one first actuator (depicted as a first actuator 108), and a processor 110.

FIG. 1 is merely an example, which should not unduly limit the scope of the claims herein. It will be appreciated that the specific designation for the projection apparatus 100 is provided as an example and is not to be construed as limiting the projection apparatus 100 to specific numbers or types of means for detecting the gaze direction, projectors, first optical elements, actuators and processors. A person skilled in the art will recognize many variations, alternatives, and modifications of embodiments of the present disclosure.

Figure 2:
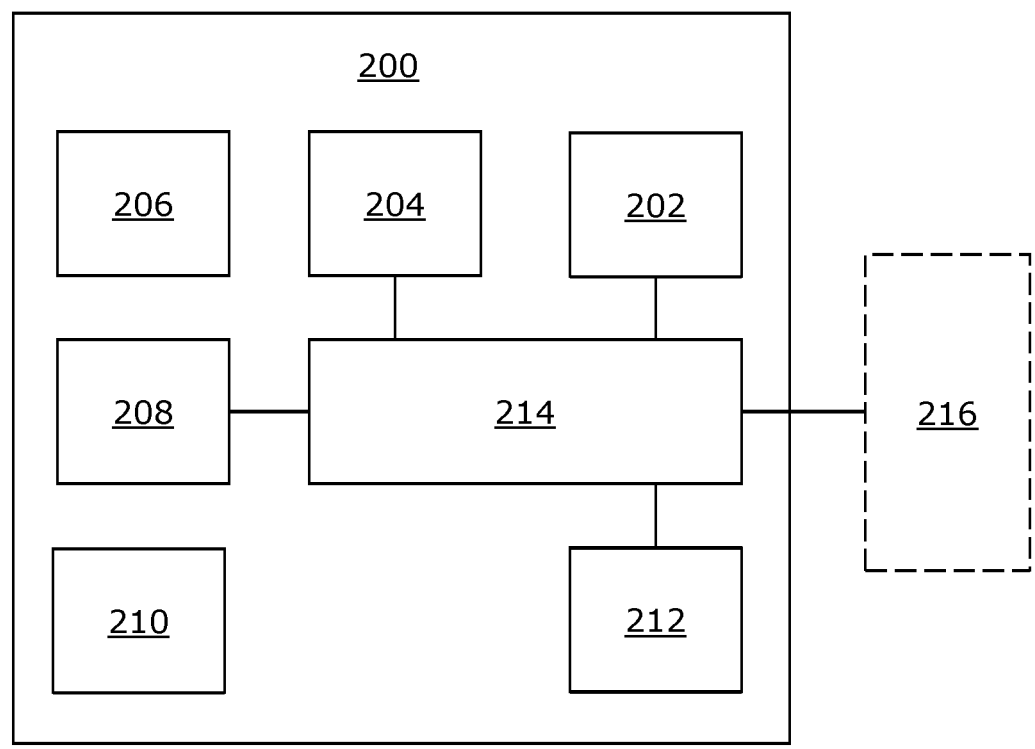
FIG. 2 is a block diagram of architecture of a direct retinal projection apparatus, in accordance with a specific embodiment of the present disclosure.

Referring to FIG. 2, illustrated is a block diagram of architecture of a direct retinal projection apparatus 200, in accordance with a specific embodiment of the present disclosure. The projection apparatus 200 comprises means 202 for detecting a gaze direction of a user, at least one projector (depicted as a projector 204), at least one first optical element (depicted as a first optical element 206), at least one first actuator (depicted as a first actuator 208), at least one second optical element (depicted as a second optical element 210), means 212 for tracking a head orientation of the user, and a processor 214. Optionally, an imaging unit 216 is coupled in communication with the processor 214.

FIG. 2 is merely an example, which should not unduly limit the scope of the claims herein. It will be appreciated that the specific designation for the projection apparatus 200 is provided as an example and is not to be construed as limiting the projection apparatus 200 to specific numbers or types of means for detecting the gaze direction, projectors, first optical elements, actuators, second optical elements, means for tracking the head orientation and processors. A person skilled in the art will recognize many variations, alternatives, and modifications of embodiments of the present disclosure.

Figure 3:
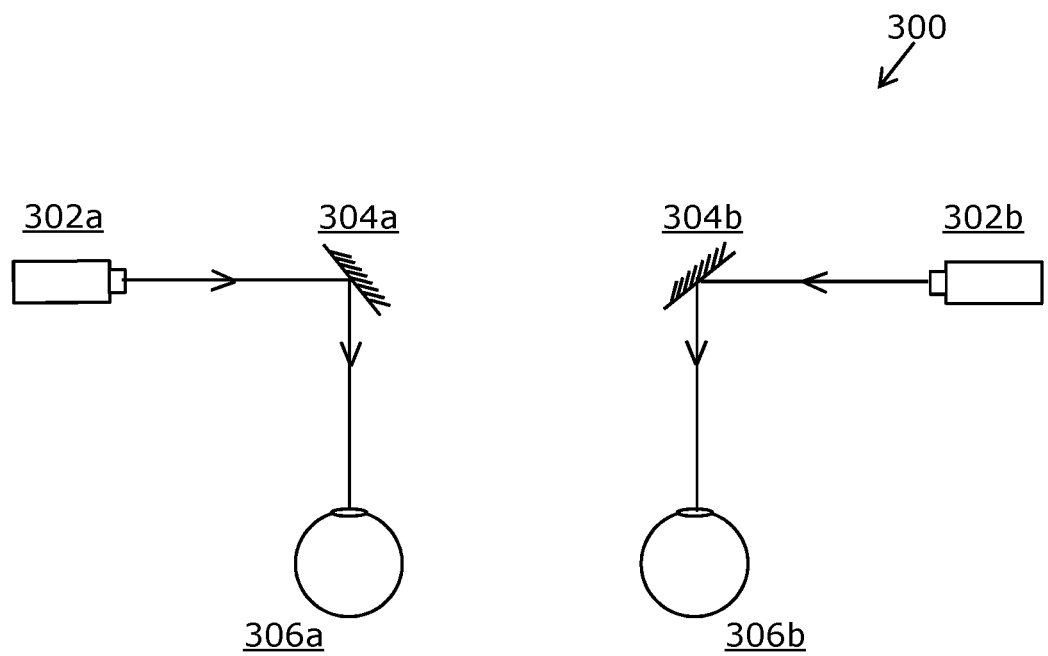
FIG. 3 is a schematic illustration of a direct retinal projection apparatus in which a first optical element reflects a projection of a rendered image directly towards a retina of a user's eye, according to an embodiment of the present disclosure.

Next, FIG. 3 is a schematic illustration of a direct retinal projection apparatus 300 in which a first optical element reflects a projection of a rendered image directly towards a retina of a user's eye, according to an embodiment of the present disclosure. The projection apparatus 300 comprises means for detecting a gaze direction of the user (not shown), projectors 302a and 302b, first optical elements 304a and 304b and their respective actuators (not shown), and a processor (not shown). With reference to FIG. 3, the first optical elements 304a and 304b could be implemented either as symmetric mirrors or as asymmetric mirrors.

The projector 302a and the first optical element 304a are employed to produce a de-warped image having a spatially-variable angular resolution on a retina of the user's eye 306a, while the projector 302b and the first optical element 304b are employed to produce another de-warped image having a spatially-variable angular resolution on a retina of the user's eye 306b.

The first optical element 304a is arranged to receive a projection of a warped image rendered by the projector 302a, differently magnify and reflect projections of a first portion and a second portion of the warped image towards the retina of the user's eye 306a to produce a first portion and a second portion of the de-warped image, respectively. In operation, an orientation of the first optical element 304a is adjusted, based on the detected gaze direction of the user, to reflect said differently-magnified projections towards the retina of the user's eye 306a and to produce the second portion of the de-warped image on a fovea of the user's eye 306a.

Likewise, the first optical element 304b is arranged to receive a projection of a warped image rendered by the projector 302b, differently magnify and reflect projections of a first portion and a second portion of said warped image towards the retina of the user's eye 306b to produce a first portion and a second portion of another de-warped image, respectively. In operation, an orientation of the first optical element 304b is adjusted, based on the detected gaze direction of the user, to reflect said differently-magnified projections towards the retina of the user's eye 306b and to produce the second portion of the de-warped image on a fovea of the user's eye 306b.

Figure 4:
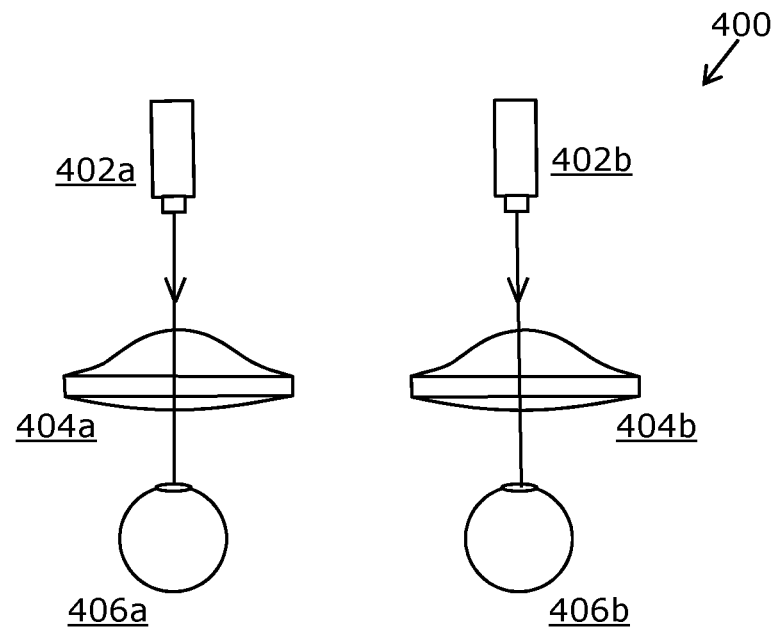
FIG. 4 is a schematic illustration of a direct retinal projection apparatus in which a first optical element passes a projection of a rendered image directly towards a retina of a user's eye, according to another embodiment of the present disclosure.

Next, FIG. 4 is a schematic illustration of a direct retinal projection apparatus 400 in which a first optical element passes a projection of a rendered image directly towards a retina of a user's eye, according to another embodiment of the present disclosure. The projection apparatus 400 comprises means for detecting a gaze direction of the user (not shown), projectors 402a and 402b, first optical elements 404a and 404b and their respective actuators (not shown), and a processor (not shown). With reference to FIG. 4, the first optical elements 404a and 404b could be implemented either as symmetric lenses or as asymmetric lenses.

The first optical element 404a is arranged to receive a projection of a warped image rendered by the projector 402a and pass differently-magnified projections of a first portion and a second portion of the warped image towards the retina of the user's eye 406a to produce a first portion and a second portion of a de-warped image, respectively. In operation, an orientation of the first optical element 404a is adjusted, based on the detected gaze direction of the user, to direct said differently-magnified projections towards the retina of the user's eye 406a and to produce the second portion of the de-warped image on a fovea of the user's eye 406a.

Likewise, the first optical element 404b is arranged to receive a projection of a warped image rendered by the projector 402b and pass differently-magnified projections of a first portion and a second portion of said warped image towards the retina of the user's eye 406b to produce a first portion and a second portion of a de-warped image, respectively. In operation, an orientation of the first optical element 404b is adjusted, based on the detected gaze direction of the user, to direct said differently-magnified projections towards the retina of the user's eye 406b and to produce the second portion of the de-warped image on a fovea of the user's eye 406b.

Figure 5:
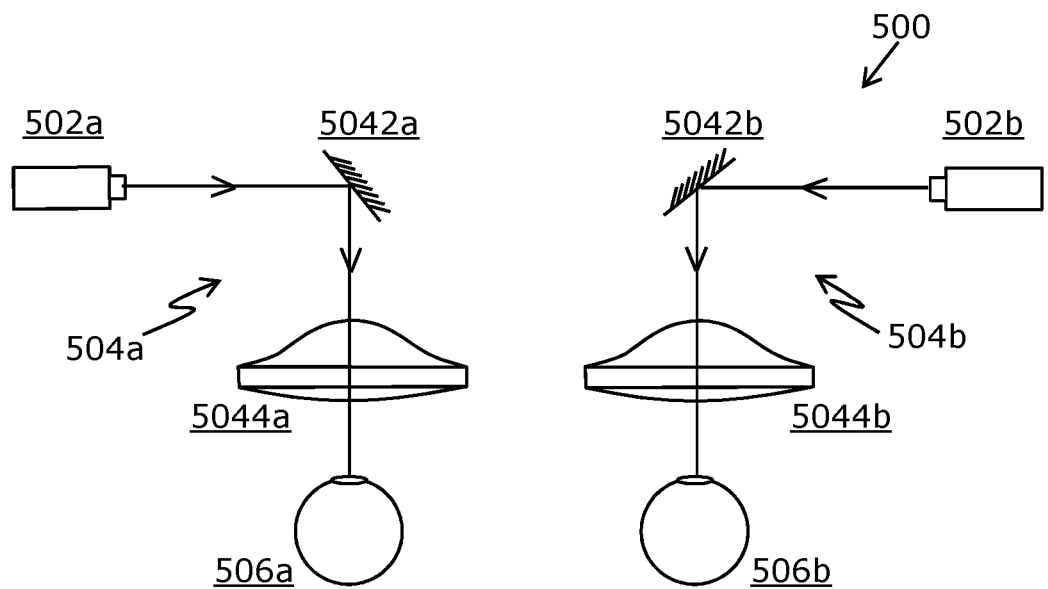
FIG. 5 is a schematic illustration of a direct retinal projection apparatus in which a first optical element reflects a projection of a rendered image directly towards a retina of a user's eye, according to yet another embodiment of the present disclosure.

Next, FIG. 5 is a schematic illustration of a direct retinal projection apparatus 500 in which a first optical element reflects a projection of a rendered image directly towards a retina of a user's eye, according to yet another embodiment of the present disclosure. The projection apparatus 500 comprises means for detecting a gaze direction of the user (not shown), projectors 502a and 502b, first optical elements 504a and 504b and their respective actuators (not shown), and a processor (not shown). With reference to FIG. 5, the first optical element 504a comprises a plane mirror 5042a and a lens 5044a, while the first optical element 504b comprises a plane mirror 5042b and a lens 5044b. The lenses 5044a and 5044b could be implemented either as symmetric lenses or as asymmetric lenses.

With reference to FIG. 5, the plane mirror 5042a is arranged between the projector 502a and the lens 5044a, while the plane mirror 5042b is arranged between the projector 502b and the lens 5044b. It will be appreciated that in an alternative implementation, a given lens may be arranged between a given projector and a given plane mirror.

Figure 6:
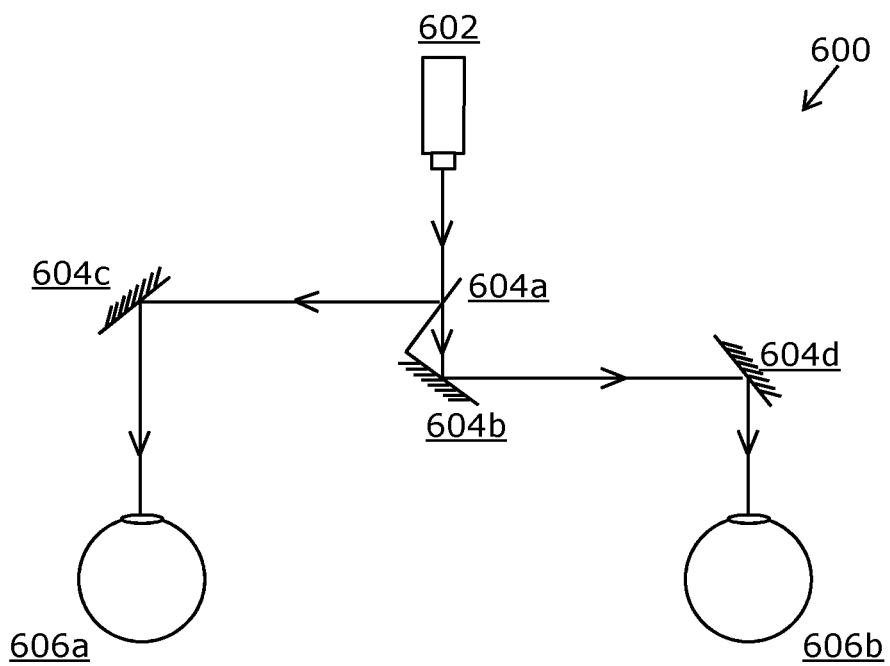
FIG. 6 is a schematic illustration of a direct retinal projection apparatus in which a first optical element reflects a projection of a rendered image directly towards a retina of a user's eye, according to still another embodiment of the present disclosure.

FIG. 6 is a schematic illustration of a direct retinal projection apparatus 600 in which a first optical element reflects a projection of a rendered image directly towards a retina of a user's eye, according to still another embodiment of the present disclosure. The projection apparatus 600 comprises means for detecting a gaze direction of the user (not shown), a projector 602, first optical elements 604a, 604b, 604c and 604d and their respective actuators (not shown), and a processor (not shown).

The projector 602 is employed on a shared basis to produce different de-warped images on a retina of the user's eye 606a and a retina of the user's eye 606b, respectively. The first optical element 604a is semi-transparent and is arranged to partially reflect a projection of a warped image rendered by the projector 602 towards the first optical element 604c. The first optical element 604c differently magnifies and reflects projections of a first portion and a second portion of the warped image towards the retina of the user's eye 606a to produce a first portion and a second portion of a de-warped image, respectively. In operation, an orientation of at least one of: the first optical element 604a, the first optical element 604c is adjusted, based on the detected gaze direction of the user, to reflect said differently-magnified projections towards the retina of the user's eye 606a and to produce the second portion of the de-warped image on a fovea of the user's eye 606a.

As shown in FIG. 6, the semi-transparent first optical element 604a partially transmits the projection of the warped image towards the first optical element 604b, which reflects said projection towards the first optical element 604d. The first optical element 604d differently magnifies and reflects projections of a first portion and a second portion of the warped image towards the retina of the user's eye 606b to produce a first portion and a second portion of another de-warped image, respectively. In operation, an orientation of at least one of: the first optical element 604b, the first optical element 604d is adjusted, based on the detected gaze direction of the user, to reflect said differently-magnified projections towards the retina of the user's eye 606b and to produce the second portion of the de-warped image on a fovea of the user's eye 606b. It will thus be appreciated that rays depicted in FIG. 6 may not necessarily be on a same plane.

Figure 7:
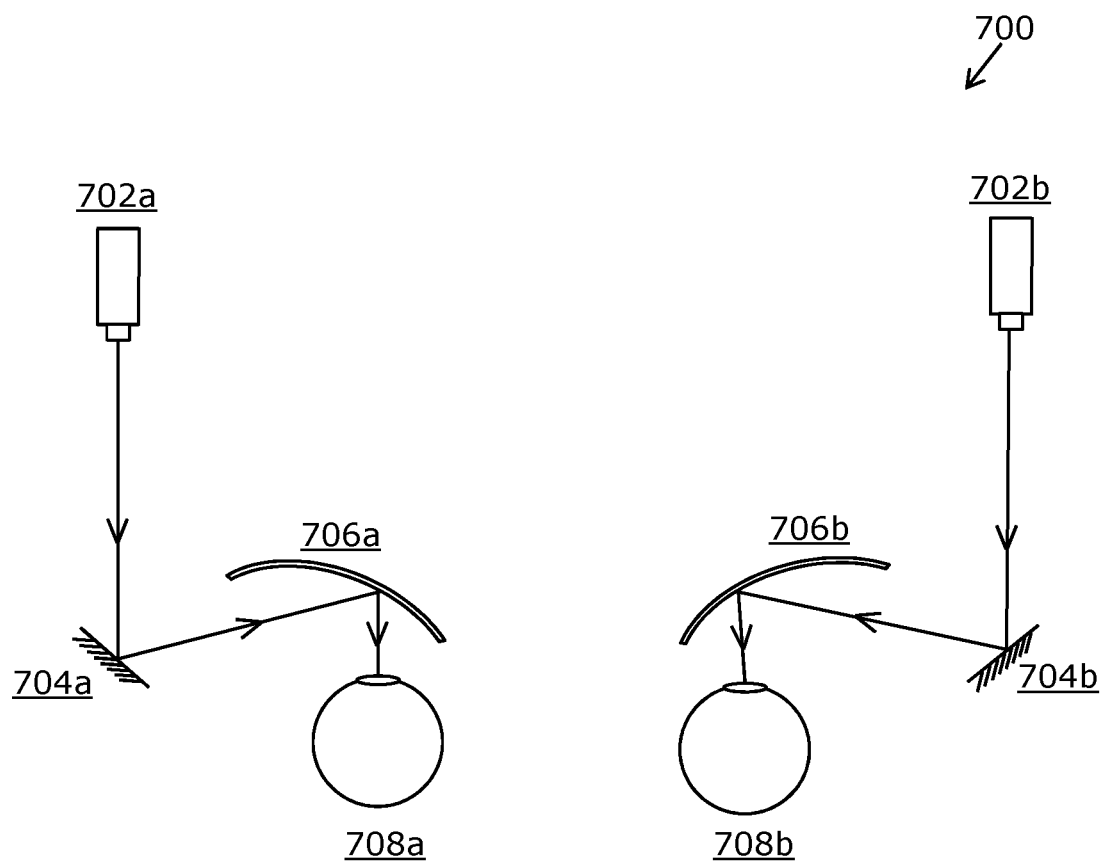
FIG. 7 is a schematic illustration of a direct retinal projection apparatus in which a first optical element reflects a projection of a rendered image indirectly towards a retina of a user's eye, according to an embodiment of the present disclosure.

Next, FIG. 7 is a schematic illustration of a direct retinal projection apparatus 700 in which a first optical element reflects a projection of a rendered image indirectly towards a retina of a user's eye, according to an embodiment of the present disclosure. The projection apparatus 700 comprises means for detecting a gaze direction of the user (not shown), projectors 702a and 702b, first optical elements 704a and 704b and their respective actuators (not shown), second optical elements 706a and 706b and a processor (not shown). With reference to FIG. 7, the first optical elements 704a and 704b could be implemented either as symmetric mirrors or as asymmetric mirrors. It will be appreciated that the optical elements 704a and 704b could alternatively be implemented as any one of: symmetric lenses, asymmetric lenses, plane mirrors along with symmetric lenses, plane mirrors along with asymmetric lenses, plane mirrors along with diffractive lenses, prisms with freeform reflective surfaces.

The first optical element 704a is arranged to receive a projection of a warped image rendered by the projector 702a, differently magnify and reflect projections of a first portion and a second portion of the warped image towards the retina of the user's eye 708a, indirectly via the second optical element 706a, to produce a first portion and a second portion of a de-warped image, respectively. In operation, an orientation of the first optical element 704a is adjusted, based on the detected gaze direction of the user, to reflect the projection of the second portion of the de-warped image towards a given portion of the second optical element 706a from where said projection is directed towards a fovea of the user's eye 708a.

Likewise, the first optical element 704b is arranged to receive a projection of a warped image rendered by the projector 702b, differently magnify and reflect projections of a first portion and a second portion of the warped image towards the retina of the user's eye 708b, indirectly via the second optical element 706b, to produce a first portion and a second portion of a de-warped image, respectively. In operation, an orientation of the first optical element 704b is adjusted, based on the detected gaze direction of the user, to reflect the projection of the second portion of said de-warped image towards a given portion of the second optical element 706b from where said projection is directed towards a fovea of the user's eye 708b.

Figure 8:
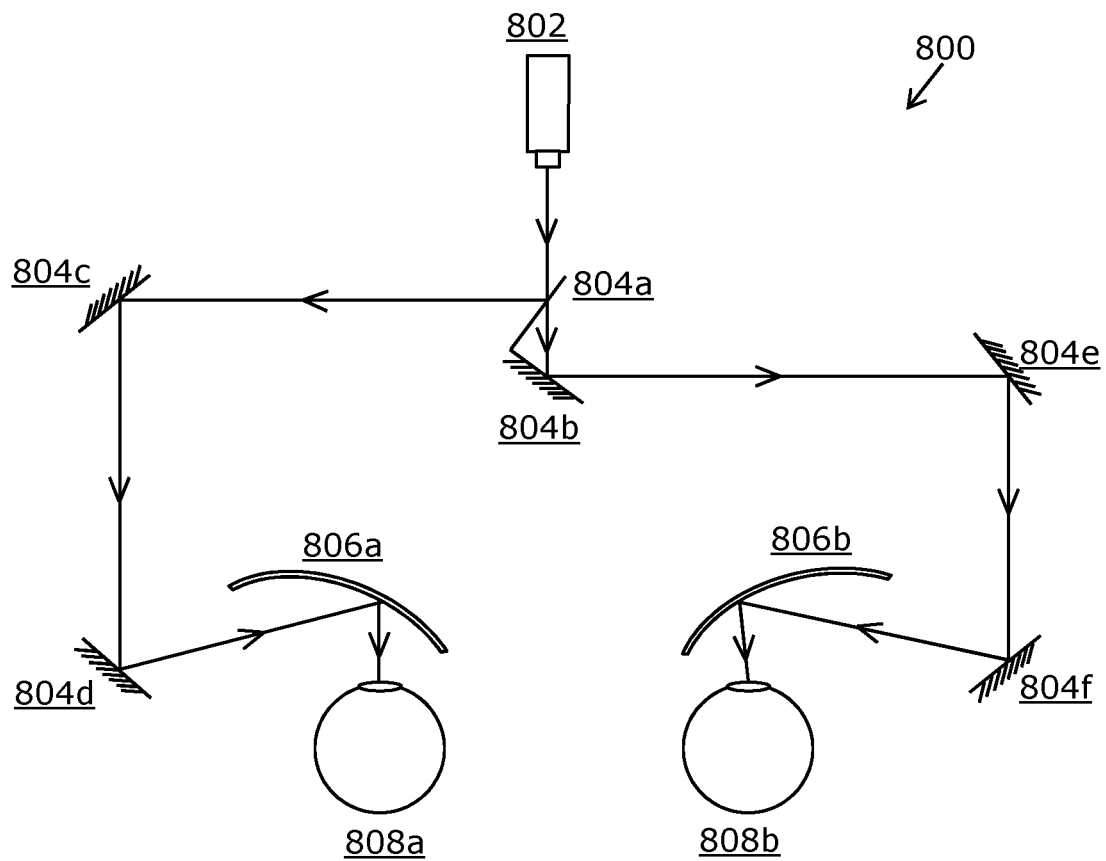
FIG. 8 is a schematic illustration of a direct retinal projection apparatus in which a first optical element reflects a projection of a rendered image indirectly towards a retina of a user's eye, according to another embodiment of the present disclosure.

FIG. 8 is a schematic illustration of a direct retinal projection apparatus 800 in which a first optical element reflects a projection of a rendered image indirectly towards a retina of a user's eye, according to another embodiment of the present disclosure. The projection apparatus 800 comprises means for detecting a gaze direction of the user (not shown), a projector 802, first optical elements 804a, 804b, 804c, 804d, 804e and 804f and their respective actuators (not shown), second optical elements 806a and 806b and a processor (not shown).

The projector 802 is employed on a shared basis to produce different de-warped images on a retina of the user's eye 808a and a retina of the user's eye 808b, respectively. The first optical element 804a is semi-transparent and is arranged to partially reflect a projection of a warped image rendered by the projector 802 towards the first optical element 804c, which then reflects the projection of the warped image towards the first optical element 804d. The first optical element 804d differently magnifies and reflects projections of a first portion and a second portion of the warped image towards the retina of the user's eye 808a, indirectly via the second optical element 806a, to produce a first portion and a second portion of a de-warped image, respectively. In operation, an orientation of at least one of: the first optical element 804a, the first optical element 804c, the first optical element 804d is adjusted, based on the detected gaze direction of the user, to reflect the projection of the second portion of the de-warped image towards a given portion of the second optical element 806a from where said projection is directed towards a fovea of the user's eye 808a.

As shown in FIG. 8, the semi-transparent first optical element 804a partially transmits the projection of the warped image towards the first optical element 804b, which reflects said projection towards the first optical element 804e, which then reflects said projection towards the first optical element 804f. The first optical element 804f differently magnifies and reflects projections of a first portion and a second portion of the warped image towards the retina of the user's eye 808b, indirectly via the second optical element 806b, to produce a first portion and a second portion of another de-warped image, respectively. In operation, an orientation of at least one of: the first optical element 804b, the first optical element 804e, the first optical element 804f is adjusted, based on the detected gaze direction of the user, to reflect the projection of the second portion of said de-warped image towards a given portion of the second optical element 806b from where said projection is directed towards a fovea of the user's eye 808b.

Beneficially, the projector 802 and the first optical elements 804a, 804b, 804c, 804d, 804e and 804f are arranged outside a field of view of the user's eyes 808a and 808b. Instead of being arranged in front of the user's eyes 808a and 808b (as would appear due to a two-dimensional nature of FIG. 8), these components of the projection apparatus 800 may be arranged above or below and around the user's eyes 808a and 808b when the projection apparatus 800 is worn by the user. It will thus be appreciated that rays depicted in FIG. 8 may not necessarily be on a same plane.

FIGS. 3, 4, 5, 6, 7 and 8 are merely examples, which should not unduly limit the scope of the claims herein. A person skilled in the art will recognize many variations, alternatives, and modifications of embodiments of the present disclosure. For example, the first optical element 804c and the first optical element 804e may differently magnify the projections of the first portion and the second portion of the warped image, instead of the first optical element 804d and the first optical element 804f, respectively.

Figure 9A:
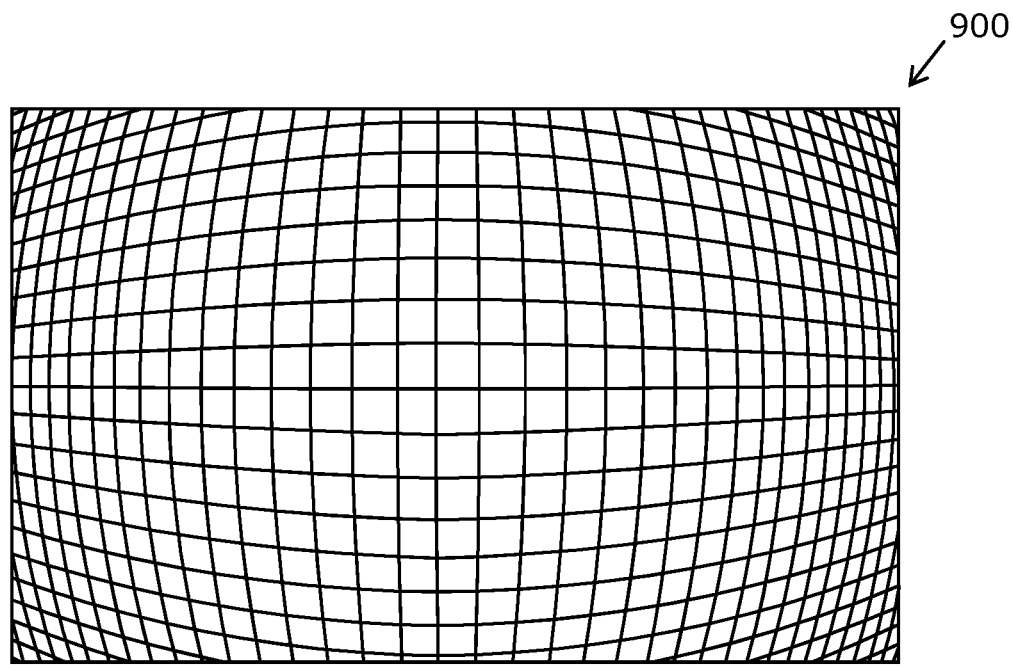
FIG. 9A is an exemplary illustration of a warped image as rendered via a projector.

FIG. 9A is an example illustration of a warped image 900 as rendered via a projector, in accordance with an embodiment of the present disclosure. The warped image 900 comprises a first portion (depicted, for example, as a peripheral portion of the warped image 900) and a second portion (depicted, for example, as a central portion of the warped image 900). The warped image 900 has a spatially-uniform angular resolution.

Figure 9B:
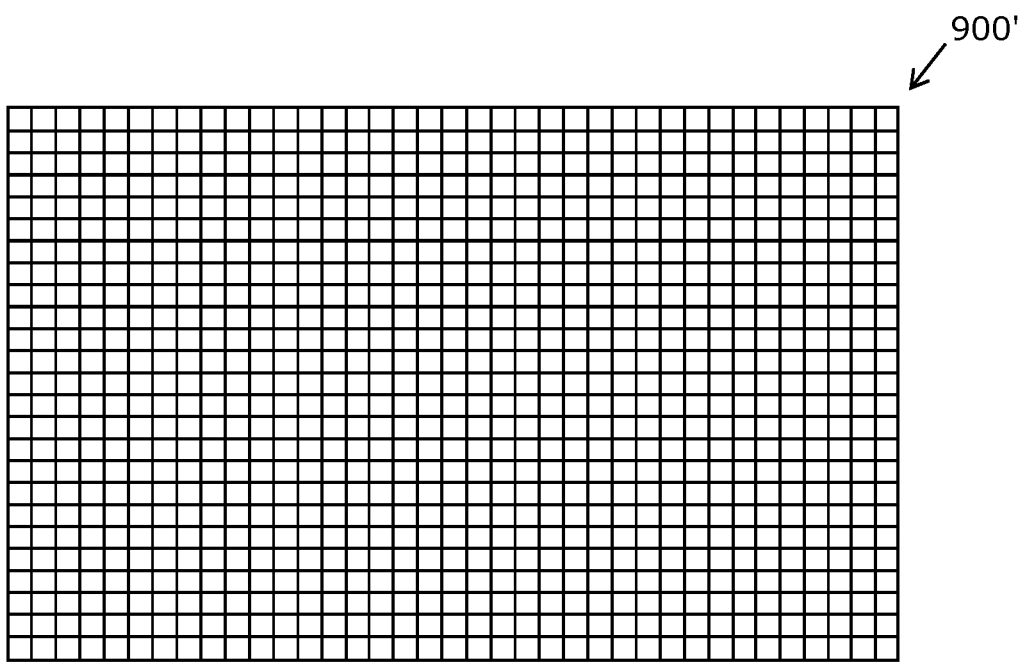
FIG. 9B is an exemplary illustration of a de-warped image that is produced on a retina of a user's eye when the warped image is optically de-warped by at least one first optical element, in accordance with an embodiment of the present disclosure.

FIG. 9B is an example illustration of a de-warped image 900' that is produced on a retina of a user's eye when the warped image 900 is optically de-warped by at least one first optical element, in accordance with an embodiment of the present disclosure. Projections of the first portion and the second portion of the warped image 900 are differently magnified by a first optical portion and a second optical portion of the at least one first optical element, respectively, to produce a first portion and a second portion of the de-warped image 900' (depicted, for example, as a peripheral portion and a central portion of the de-warped image 900'). It will be appreciated that an angular resolution of the second portion of the de-warped image 900' is greater than an angular resolution of the first portion of the de-warped image 900'.

Figure 10:
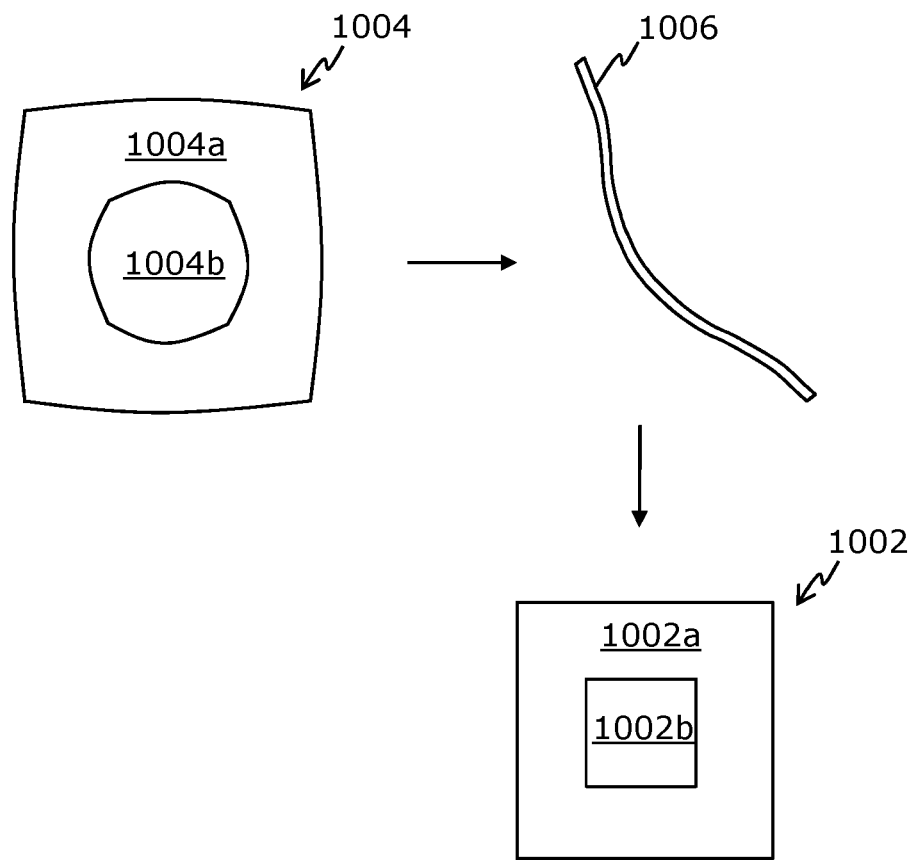
FIG. 10 is an exemplary illustration of a de-warped image that is produced on a retina of a user's eye when a warped image is optically de-warped by a first optical element, in accordance with an embodiment of the present disclosure.

FIG. 10 is a simplified illustration of a de-warped image 1002 that is produced on a retina of a user's eye when a warped image 1004 is optically de-warped by a first optical element 1006, in accordance with an embodiment of the present disclosure. The warped image 1004 has a spatially-uniform angular resolution. Projections of a first portion 1004a and a second portion 1004b of the warped image 1004 are differently magnified by a first optical portion and a second optical portion of the first optical element 1006 to produce a first portion 1002a and a second portion 1002b of the de-warped image 1002, respectively. Notably, the de-warped image 1002 has a spatially-variable angular resolution, wherein an angular resolution of the second portion 1002b is greater than an angular resolution of the first portion 1002a.

FIGS. 9A and 9B and 10 are merely examples, which should not unduly limit the scope of the claims herein. A person skilled in the art will recognize many variations, alternatives, and modifications of embodiments of the present disclosure.

Figure 11A:
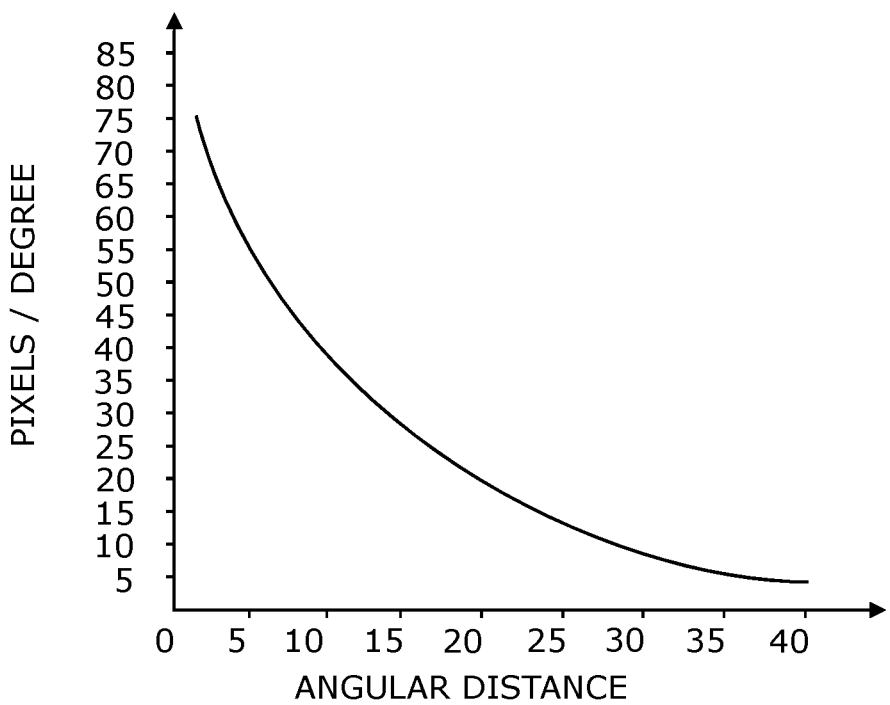
FIGS. 11A, 11B and 11C are exemplary illustrations of graphical representations of an angular resolution of a de-warped image as a function of an angular distance between a center of a second portion (namely, a high-resolution portion) of the de-warped image and an edge of the de-warped image, in accordance with different embodiments of the present disclosure.
Figure 11B:
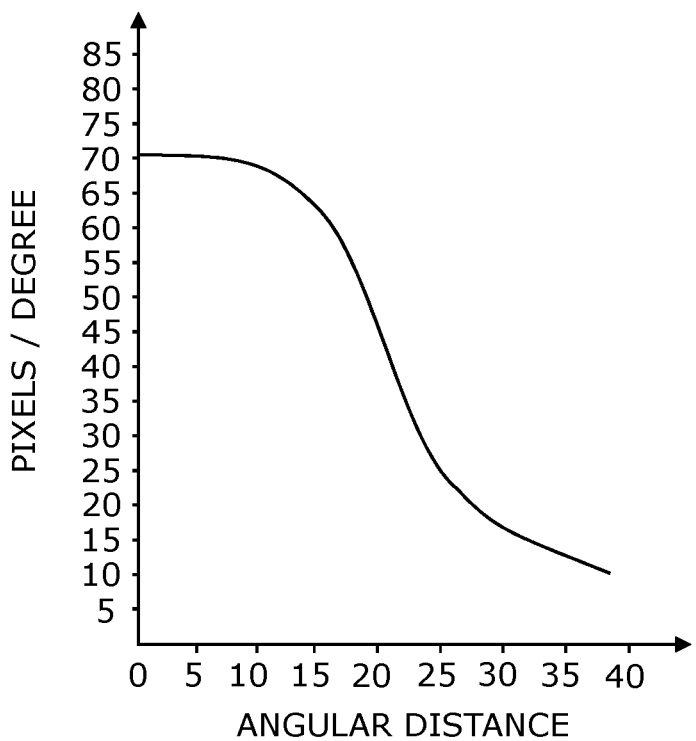
Figure 11C:
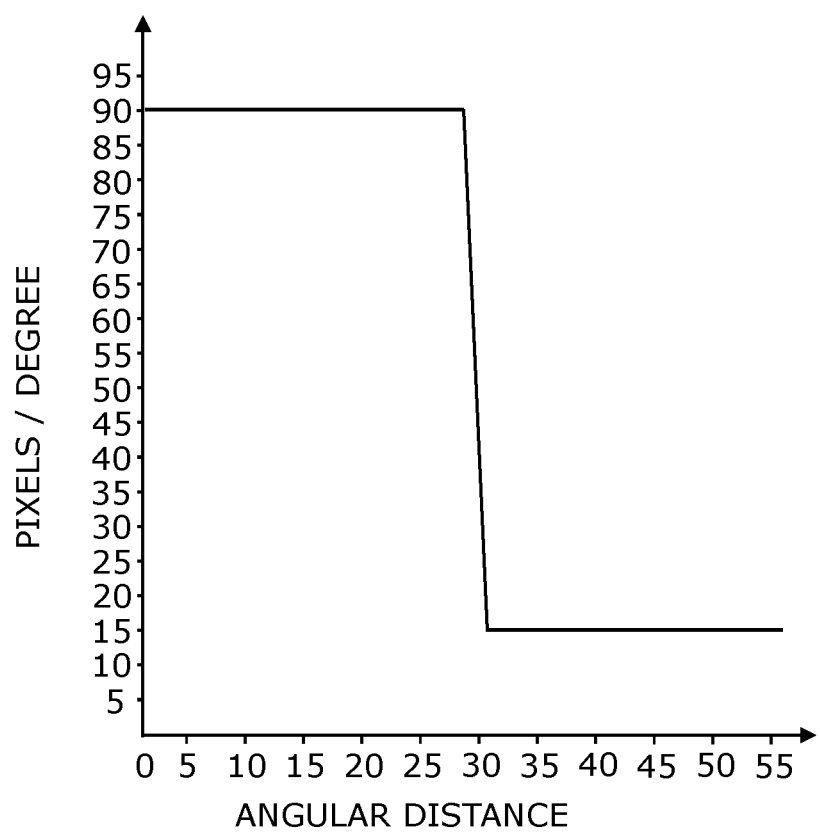

Referring to FIGS. 11A, 11B and 11C, illustrated are example graphical representations of an angular resolution of a de-warped image as a function of an angular distance between a center of a second portion (namely, a high-resolution portion) of the de-warped image and an edge of the de-warped image, in accordance with different embodiments of the present disclosure. In FIG. 11A, the angular resolution of the de-warped image varies non-linearly. The angular resolution is the maximum near the center of the second portion of the de-warped image and decreases exponentially on going from the center towards the edge of the de-warped image. In FIG. 11B, the angular resolution of the de-warped image varies non-linearly. The angular resolution is the maximum near the center of the second portion of the de-warped image and decreases non-linearly on going from the center towards the edge of the de-warped image. In FIG. 11C, the angular resolution of the de-warped image varies in a step-wise manner.

Figure 12A:
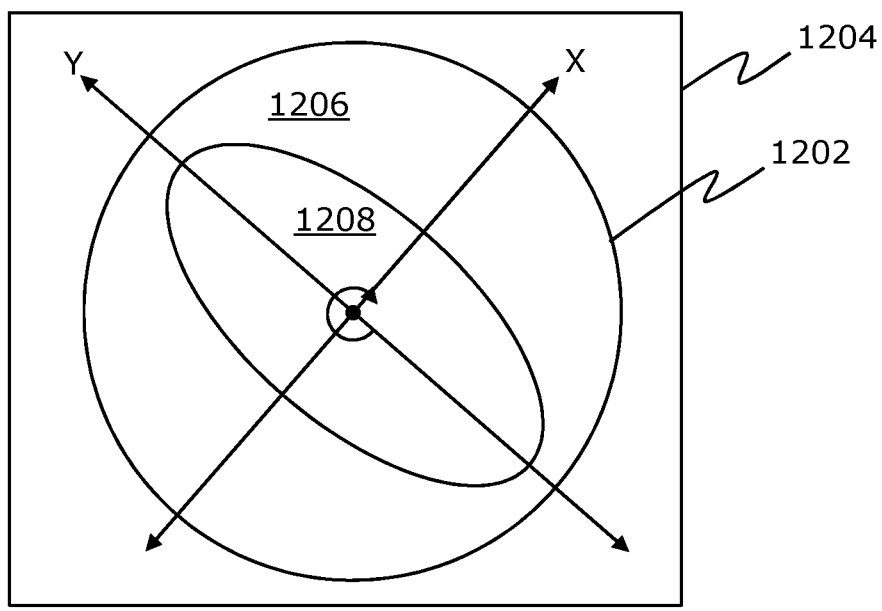
FIG. 12A is a schematic illustration of an example implementation where a symmetrical first optical element is rotated with respect to a warped image rendered via a projector.
Figure 12B:
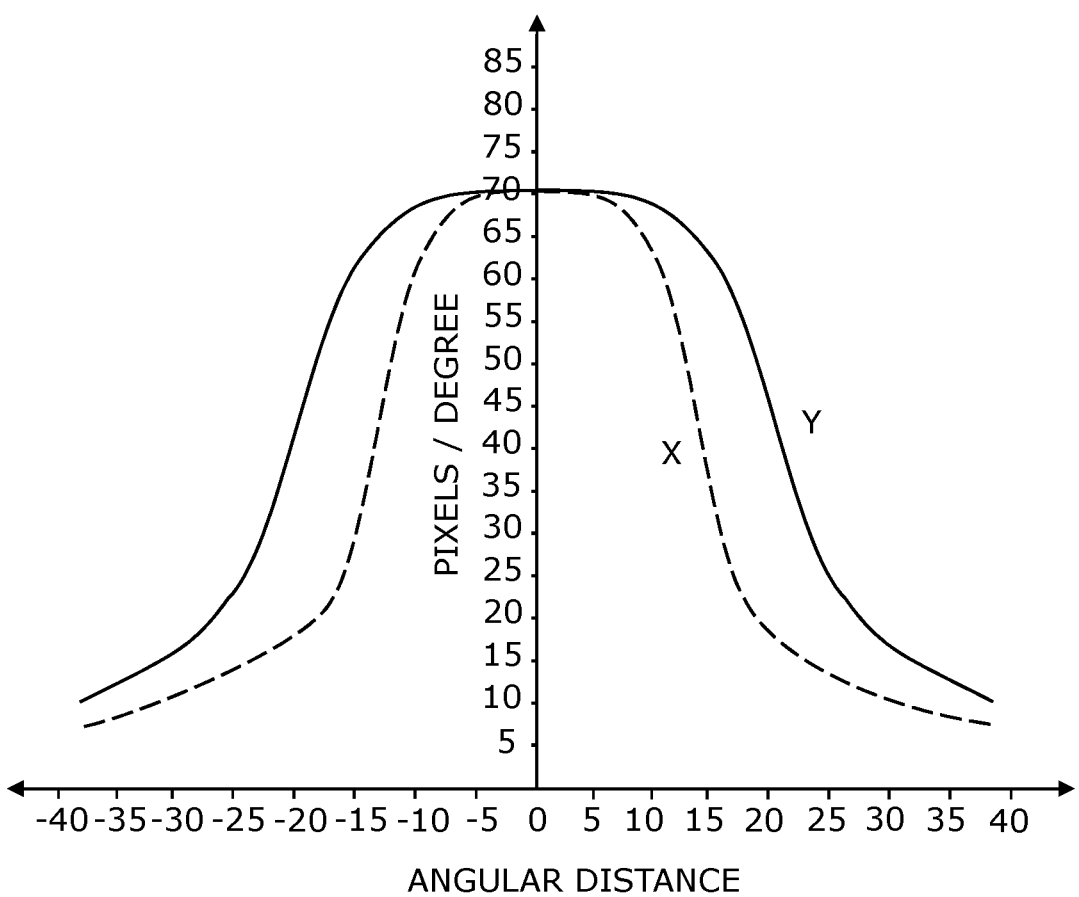
FIG. 12B is an exemplary graphical representation of an angular resolution of a given portion of a de-warped image as a function of an angular distance between the given portion of the de-warped image and a center of the de-warped image, the warped image being optically de-warped using the symmetrical first optical element to produce the de-warped image, in accordance with an embodiment of the present disclosure.

FIG. 12A is a schematic illustration of an example implementation where a symmetrical first optical element 1202 is rotated with respect to a warped image 1204 rendered via a projector, while FIG. 12B is an example graphical representation of an angular resolution of a given portion of a de-warped image as a function of an angular distance between the given portion of the de-warped image and a center of the de-warped image, the warped image being optically de-warped using the symmetrical first optical element 1202 to produce the de-warped image, in accordance with an embodiment of the present disclosure.

In this example implementation, the symmetrical first optical element 1202 could be implemented as any of: a symmetric mirror, a symmetric lens, at least one plane mirror along with a symmetric lens. The symmetrical first optical element 1202 comprises a first optical portion 1206 and a second optical portion 1208 having different optical properties with respect to magnification. The second optical portion 1208 is shown to be substantially ellipsoidal in shape.

In FIG. 12A, there is also shown an optical center (depicted by a black dot) of the second optical portion 1208, which is also a center of rotation of the symmetrical first optical element 1202. Two lines representing X and Y directions pass through the center of rotation, which overlaps with the center of the warped image.

A rotational orientation of the symmetrical first optical element 1202 is adjusted, according to a detected gaze direction of a user, to align the first optical portion 1206 and the second optical portion 1208 with a first portion and a second portion of the warped image 1204.

When moving from a first rotational orientation to a second rotational orientation (namely, with respect to a change in the user's gaze direction), the symmetrical first optical element 1202 is required to be rotated at an angle that lies in:

a range of 0 degrees to 180 degrees, when the symmetrical first optical element 1202 rotates in only one direction, or a range of 0 degrees to 90 degrees, when the symmetrical first optical element 1202 rotates in both directions.

As shown in FIG. 12B, the angular resolution is the maximum near the center of the de-warped image, and decreases non-linearly on going from the center towards an edge of the de-warped image. The angular resolution of a given portion of the de-warped image that spans approximately from −10 degrees to +10 degrees of a field of view along the X-direction and from −20 degrees to +20 degrees of the field of view along the Y-direction is much greater than the angular resolution of a remaining portion of the de-warped image.

Figure 13A:
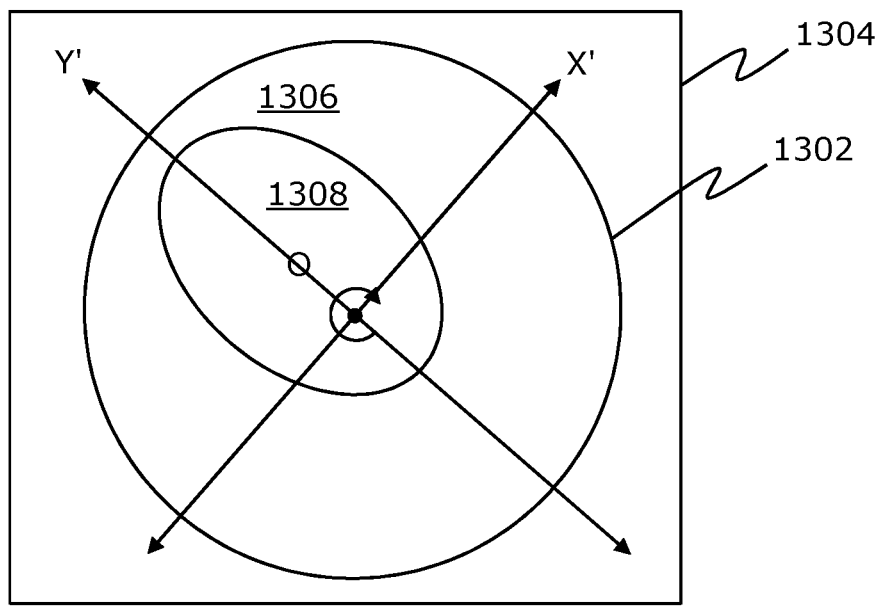
FIG. 13A is a schematic illustration of another example implementation where an asymmetrical first optical element is rotated with respect to a warped image rendered via a projector.
Figure 13B:
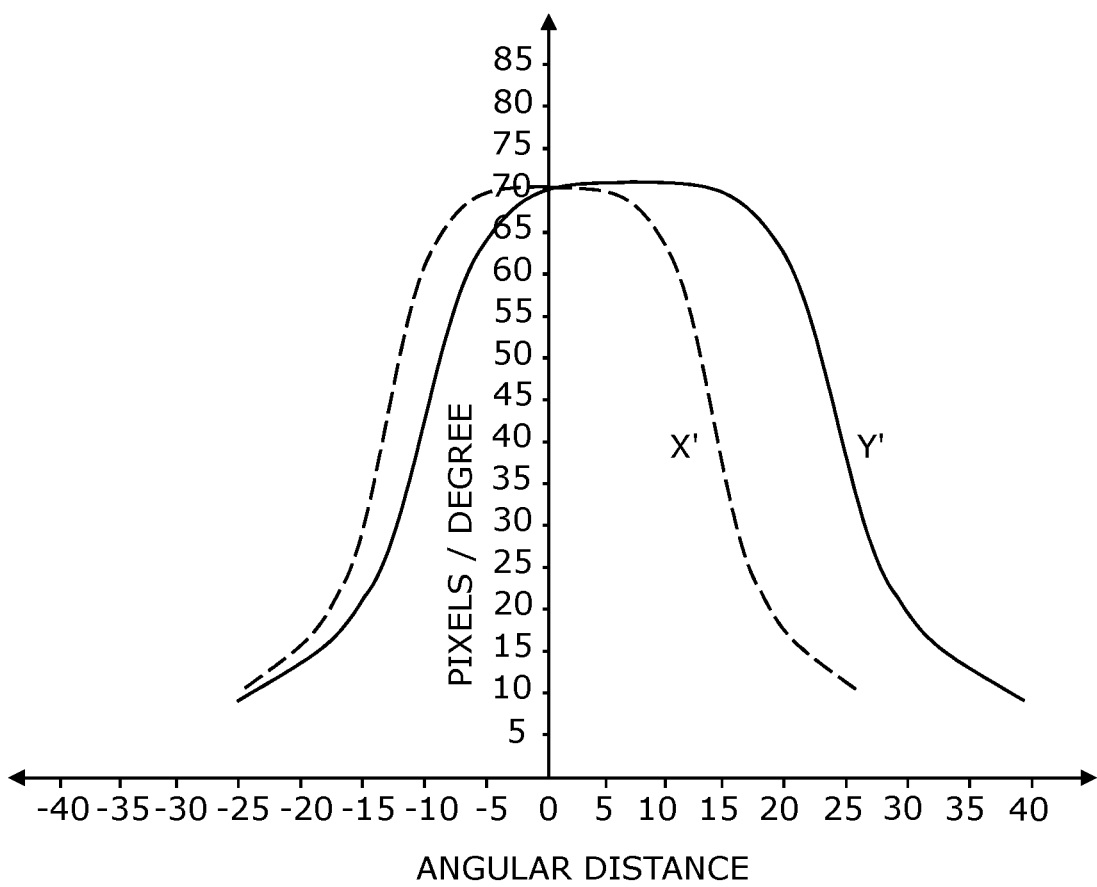
FIG. 13B is an example graphical representation of an angular resolution of a given portion of a de-warped image as a function of an angular distance between the given portion of the de-warped image and a center of the de-warped image, the warped image being optically de-warped using the asymmetrical first optical element to produce the de-warped image, in accordance with another embodiment of the present disclosure.

FIG. 13A is a schematic illustration of another example implementation where an asymmetrical first optical element 1302 is rotated with respect to a warped image 1304 rendered via a projector, while FIG. 13B is an example graphical representation of an angular resolution of a given portion of a de-warped image as a function of an angular distance between the given portion of the de-warped image and a center of the de-warped image, the warped image being optically de-warped using the asymmetrical first optical element 1302 to produce the de-warped image, in accordance with another embodiment of the present disclosure.

In this example implementation, the asymmetrical first optical element 1302 is implemented as any of: an asymmetric mirror, at least one plane mirror along with an asymmetric lens, at least one plane mirror along with a diffractive lens, a prism with at least one free-form reflective surface, an asymmetric lens. The asymmetrical first optical element 1302 comprises a first optical portion 1306 and a second optical portion 1308 having different optical properties with respect to magnification. The second optical portion 1308 is shown to be substantially ellipsoidal in shape.

In FIG. 13A, there is also shown an optical center '0' of the second optical portion 1308, and a center of rotation (depicted by a black dot) of the asymmetrical first optical element 1302. Two lines representing X' and Y' directions pass through the center of rotation, which overlaps with the center of the warped image. As the optical center '0' of the second optical portion 1308 is not the same as the center of rotation, the asymmetrical first optical element 1302 is rotated (namely, about the center of rotation) to cover a circular area using the second optical portion 1308.

A rotational orientation of the asymmetrical first optical element 1302 is adjusted, according to a detected gaze direction of a user, to align the first optical portion 1306 and the second optical portion 1308 with a first portion and a second portion of the warped image 1304.

When moving from a first rotational orientation to a second rotational orientation, the asymmetrical first optical element 1302 is required to be rotated at an angle that lies in:

a range of 0 degrees to 360 degrees, when the asymmetrical first optical element 1302 rotates in only one direction, or a range of 0 degrees to 180 degrees, when the asymmetrical first optical element 1302 rotates in both directions.

As shown in FIG. 13B, the angular resolution of a given portion of the de-warped image that spans approximately from −10 degrees to +10 degrees of a field of view along the X'-direction and from −5 degrees to +25 degrees of the field of view along the Y'-direction is much greater than the angular resolution of a remaining portion of the de-warped image.

FIGS. 12A, 12B, 13A and 13B are merely examples, which should not unduly limit the scope of the claims herein. A person skilled in the art will recognize many variations, alternatives, and modifications of embodiments of the present disclosure.

Figure 14:
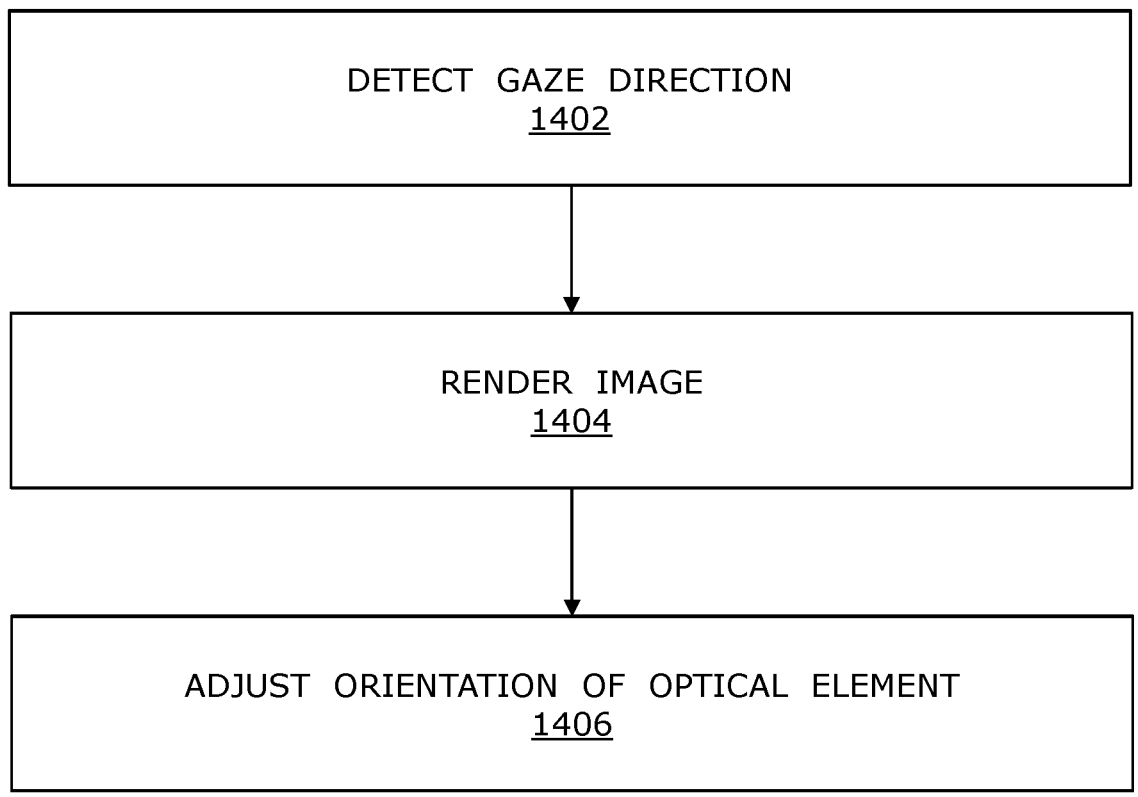
FIG. 14 are schematic illustrations of steps of a method of displaying, via a direct retinal projection apparatus, in accordance with an embodiment of the present disclosure.

Referring to FIG. 14, illustrated are steps of a method of displaying, via a direct retinal projection apparatus, in accordance with an embodiment of the present disclosure. The projection apparatus comprises at least one projector and at least one first optical element. The at least one first optical element comprises at least a first optical portion and a second optical portion having different optical properties with respect to magnification.

At a step 1402, a gaze direction of a user is detected. At a step 1404, a warped image having a spatially-uniform angular resolution is rendered via the at least one projector. Meanwhile, at a step 1406, an orientation of the at least one first optical element is adjusted, based on the detected gaze direction of the user, to direct a projection of the warped image from the at least one first optical element towards a retina of a user's eye. Consequently, projections of a first portion and a second portion of the warped image are differently magnified by the first optical portion and the second optical portion of the at least one first optical element, respectively, to produce on the retina of the user's eye a de-warped image having a spatially-variable angular resolution.

The steps 1402, 1404 and 1406 are only illustrative and other alternatives can also be provided where one or more steps are added, one or more steps are removed, or one or more steps are provided in a different sequence without departing from the scope of the claims herein. As an example, the steps 1404 and 1406 can be performed simultaneously. As another example, the steps 1404 and 1406 can be performed in a reverse order. In such a case, the warped image can be rendered just after the orientation of the at least one first optical element has been adjusted.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

It will be appreciated that the terms "first" and "second" used herein do not denote any order, quantity or importance, but rather are used to distinguish one element from another.

What is claimed is:

1. A direct retinal projection apparatus comprising:
   means for detecting a gaze direction of a user;
   at least one projector;
   at least one first optical element comprising at least a first optical portion and a second optical portion having different optical properties with respect to magnification, wherein the at least one first optical element comprises an optical axis and is asymmetrical with respect to the optical axis, and the second optical portion is substantially ellipsoidal in shape;
   at least one first actuator associated with the at least one first optical element; and a processor configured to render a warped image having a spatially-uniform angular resolution via the at least one projector, whilst adjusting an orientation of the at least one first optical element via the at least one first actuator, based on the detected gaze direction of the user, to direct a projection of the warped image from the at least one first optical element towards a retina of a user's eye, wherein the asymmetrical first optical element with the elliptical second optical portion differently magnifies projections of a first portion and a second portion of the warped image, to produce on the retina of the user's eye a de-warped image having different spatially-variable angular resolutions at least along orthogonal axes of the de-warped image.

2. The projection apparatus of claim 1, wherein the processor or an imaging unit communicably coupled to the processor is configured to generate the warped image based on the optical properties of the first optical portion and the second optical portion.

3. The projection apparatus of claim 2, wherein the processor or the imaging unit is configured to generate the warped image based on the detected gaze direction of the user.

4. The projection apparatus of claim 2, further comprising means for tracking a head orientation of the user, wherein the processor or the imaging unit is configured to generate the warped image based on the head orientation of the user.

5. The projection apparatus of claim 2, wherein, when generating the warped image, the processor or the imaging unit is configured to adjust an intensity of the first portion and the second portion of the warped image in a manner that, upon being differently magnified, the projections of the first portion and the second portion of the warped image produce on the retina of the user's eye the de-warped image that appears to have a uniform brightness thereacros s.

6. The projection apparatus of claim 1, wherein the processor is configured to adjust a rotational orientation of the at least one first optical element to align the first optical portion and the second optical portion with the first portion and the second portion of the warped image rendered via the at least one projector.

7. The projection apparatus of claim 6, wherein the processor is configured to determine a given instant of time at which the de-warped image is to be made visible to the user, based on:
  a given rotational speed of the at least one first optical element about its optical axis,
  a direction of rotation of the at least one first optical element, and
  a previous rotational orientation of the at least one first optical element.

8. The projection apparatus of claim 7, wherein the processor is configured to determine a time duration for which the de-warped image is to be made visible to the user, based upon the given rotational speed of the at least one first optical element.

9. The projection apparatus of claim 7, wherein the at least one projector is to be switched on or brightened at the given instant of time.

10. The projection apparatus of claim 1, further comprising at least one second optical element arranged on an optical path between the at least one first optical element and the user's eye, wherein the processor is configured to:
  determine, based on the detected gaze direction of the user, a given portion of the at least one second optical element at or through which the user is gazing; and
  adjust the orientation of the at least one first optical element via the at least one first actuator to direct the projection of the second portion of the warped image, optically de-warped by the second optical portion of the at least one first optical element, towards the given portion of the at least one second optical element from where said projection is directed towards a fovea of the user's eye.

11. The projection apparatus of claim 1, wherein the at least one first optical element comprises any of:
  an asymmetric mirror,
  at least one plane mirror and an asymmetric lens,
  at least one plane mirror and a diffractive lens,
  a prism with at least one free-form reflective surface,
  an asymmetric lens,
  a symmetric mirror,
  at least one plane mirror and a symmetric lens,
  a symmetric lens.

12. A method of displaying, via a direct retinal projection apparatus comprising at least one projector and at least one first optical element, the method comprising:
  detecting a gaze direction of a user;
  rendering a warped image having a spatially-uniform angular resolution via the at least one projector; and
  adjusting an orientation of the at least one first optical element, based on the detected gaze direction of the user, to direct a projection of the warped image from the at least one first optical element towards a retina of a user's eye, wherein the at least one first optical element comprises at least a first optical portion and a second optical portion having different optical properties with respect to magnification, wherein the at least one first optical element comprises an optical axis and is asymmetrical with respect to the optical axis, and the second optical portion is substantially ellipsoidal in shape, and wherein the asymmetrical first optical element with the elliptical second optical portion differently magnifies projections of a first portion and a second portion of the warped image to produce on the retina of the user's eye a de-warped image having different spatially-variable angular resolutions at least along orthogonal axes of the image.

13. The method of claim 12, further comprising generating the warped image based on the optical properties of the first optical portion and the second optical portion.

14. The method of claim 13, further comprising generating the warped image based on the detected gaze direction of the user.

15. The method of claim 13, further comprising:
  tracking a head orientation of the user; and
  generating the warped image based on the head orientation of the user.

16. The method of claim 13, wherein the step of generating the warped image comprises adjusting an intensity of the first portion and the second portion of the warped image in a manner that, upon being differently magnified, the projections of the first portion and the second portion of the warped image produce on the retina of the user's eye the de-warped image that appears to have a uniform brightness thereacross.

17. The method of claim 12, further comprising adjusting a rotational orientation of the at least one first optical element to align the first optical portion and the second optical portion with the first portion and the second portion of the warped image rendered via the at least one projector.

18. The method of claim 17, further comprising determining a given instant of time at which the de-warped image is to be made visible to the user, based on:
- a given rotational speed of the at least one first optical element about its optical axis,
- a direction of rotation of the at least one first optical element, and
- a previous rotational orientation of the at least one first optical element.

19. The method of claim 18, further comprising determining a time duration for which the de-warped image is to be made visible to the user, based upon the given rotational speed of the at least one first optical element.

20. The method of claim 18, further comprising switching on or brightening the at least one projector at the given instant of time.

21. The method of claim 12, wherein the projection apparatus further comprises at least one second optical element arranged on an optical path between the at least one first optical element and the user's eye, wherein the method further comprises:
- determining, based on the detected gaze direction of the user, a given portion of the at least one second optical element at or through which the user is gazing; and
- adjusting the orientation of the at least one first optical element to direct the projection of the second portion of the warped image, optically de-warped by the second optical portion of the at least one first optical element, towards the given portion of the at least one second optical element from where said projection is directed towards a fovea of the user's eye.

* * * * *